US010230909B2

(12) United States Patent
Kostrzewa et al.

(10) Patent No.: US 10,230,909 B2
(45) Date of Patent: Mar. 12, 2019

(54) MODULAR SPLIT-PROCESSING INFRARED IMAGING SYSTEM

(71) Applicant: FLIR Systems, Inc., Wilsonville, OR (US)

(72) Inventors: Joseph Kostrzewa, Buellton, CA (US); Bruce Covington, Santa Barbara, CA (US); Chris Posch, Santa Barbara, CA (US); Wayne Patterson, Goleta, CA (US); Charles Handley, Santa Barbara, CA (US); Dan Walker, Goleta, CA (US); Vu L. Nguyen, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 15/466,599

(22) Filed: Mar. 22, 2017

(65) Prior Publication Data
US 2017/0195584 A1 Jul. 6, 2017

Related U.S. Application Data

(63) Continuation of application No. PCT/US2015/051798, filed on Sep. 23, 2015, which is a continuation-in-part of application No. 14/852,313, filed on Sep. 11, 2015.

(60) Provisional application No. 62/222,708, filed on Sep. 23, 2015, provisional application No. 62/054,313, filed on Sep. 23, 2014.

(51) Int. Cl.
*H04N 5/33* (2006.01)
*H04N 5/225* (2006.01)

(52) U.S. Cl.
CPC ............. *H04N 5/33* (2013.01); *H04N 5/2253* (2013.01); *H04N 5/2257* (2013.01)

(58) Field of Classification Search
CPC .............................. H04N 5/2257; H04N 5/33
See application file for complete search history.

(56) References Cited

U.S. PATENT DOCUMENTS

| | | | |
|---|---|---|---|
| 4,063,812 A | 12/1977 | Abraham et al. | |
| 4,661,707 A | 4/1987 | Jungkman et al. | |
| 5,677,762 A | 10/1997 | Ortyn et al. | |
| 6,144,031 A | 11/2000 | Herring et al. | |
| 6,841,309 B1 | 1/2005 | Alpay et al. | |
| 7,910,890 B2 | 3/2011 | Hinnrichs | |
| 2009/0161006 A1 | 6/2009 | Lee | |
| 2009/0166319 A1 | 7/2009 | Courboin et al. | |

(Continued)

FOREIGN PATENT DOCUMENTS

WO      WO 0037970      6/2000

*Primary Examiner* — Marcus H Taningco
(74) *Attorney, Agent, or Firm* — Haynes and Boone, LLP

(57) ABSTRACT

Various techniques are provided to implement a modular infrared imager assembly configured to interface with supporting electronics provided, for example, by a third party. In one example, a system includes an imager assembly comprising a focal plane array configured to capture thermal image data from a scene and output the thermal image data, a printed circuit board assembly, and processing electronics communicatively connected to the focal plane array through the printed circuit board assembly and configured to receive and process the thermal image data. The system further includes a connector communicatively connected to the imager assembly and configured to interface with supporting electronics configured to receive and additionally process the thermal image data.

20 Claims, 20 Drawing Sheets

(56) References Cited

U.S. PATENT DOCUMENTS

| | | |
|---|---|---|
| 2010/0182330 A1 | 7/2010 | Tener et al. |
| 2011/0169962 A1 | 7/2011 | Gat et al. |
| 2012/0050589 A1 | 3/2012 | Ueno et al. |
| 2013/0107061 A1 | 5/2013 | Kumar et al. |
| 2014/0253735 A1 | 9/2014 | Fox et al. |
| 2014/0293062 A1 | 10/2014 | Høye et al. |

MODULAR SPLIT-PROCESSING INFRARED IMAGING SYSTEM

CROSS-REFERENCE TO RELATED APPLICATIONS

This application is a continuation of International Patent Application No. PCT/US2015/051798 filed Sep. 23, 2015 and entitled "MODULAR SPLIT-PROCESSING INFRARED IMAGING SYSTEM", which is incorporated herein by reference in its entirety.

International Patent Application No. PCT/US2015/051798 filed Sep. 23, 2015 claims the benefit of and priority to U.S. Provisional Patent Application No. 62/222,708 filed Sep. 23, 2015 and entitled "MODULAR SPLIT-PROCESSING INFRARED IMAGING SYSTEM", which is hereby incorporated by reference in its entirety.

International Patent Application No. PCT/US2015/051798 filed Sep. 23, 2015 is a continuation-in-part of U.S. patent application Ser. No. 14/852,313 filed Sep. 11, 2015 and entitled "PROTECTIVE WINDOW FOR AN INFRARED SENSOR ARRAY", which claims the benefit of and priority to U.S. Provisional Patent Application No. 62/054,313 filed Sep. 23, 2014 and entitled "PROTECTIVE WINDOW FOR AN INFRARED SENSOR ARRAY", all of which are hereby incorporated by reference in their entirety.

TECHNICAL FIELD

One or more embodiments of the invention relate generally to modular infrared imaging devices and more particularly, for example, to modules configured to be connected together to form an infrared imaging device.

BACKGROUND

Current infrared imaging devices may be integrated devices. That is, such infrared imaging devices may include fully integrated components and may need to be configured at a point of manufacture. Such fully integrated infrared imaging devices may require a high amount of effort to use in systems that they were not originally designed for. Additionally, integrated systems may process all steps of image processing with a single set of processing electronics and thus increase heat output and processor demand.

Infrared imaging devices may include a window or lens in front of a focal plane array that detects incoming thermal image radiation. Construction of these imaging devices often occurs in clean rooms, so-called due to their relative absence of environmental and atmospheric impurities, e.g., dust particulate matter. Such impurities may settle on an optical surface (e.g., a window or lens) that is within the optical focal field.

These environmental factors may cause inconsistencies or flaws in the optical surface (e.g., damage caused by such impurities and/or settling of such impurities on the optical surface) and therefore the resulting image data obtained by the infrared imaging device. This concern is particularly true for an optical surface that is located close to the sensor array such that the inconsistencies or flaws are in relatively good focus. Consequently, if such an optical surface remains open to environmental factors after construction of the infrared imaging device, those environmental factors may degrade the window or lens over time resulting in poorer performance of the device.

SUMMARY

A modular infrared imaging device may include a modular imager assembly that may be connected to a plurality of processing electronics provided by a third party (e.g., one or more customers). In one embodiment, a system may include an imager assembly and a connector. The imager assembly may include a focal plane array configured to capture thermal image data from a scene and output the thermal image data, a printed circuit board assembly, and processing electronics communicatively connected to the focal plane array through the printed circuit board assembly and configured to receive and process the thermal image data. The connector may be communicatively connected to the imager assembly and configured to interface with supporting electronics configured to receive and additionally process the thermal image data.

In another embodiment, a method may be provided. The method may include capturing thermal image data from a scene with a focal plane array of an imager assembly, outputting the thermal image data to processing electronics of the imager assembly, processing the thermal image data with the processing electronics, and communicating, with a connector, the thermal image data processed by the processing electronics to supporting electronics outside of the imager assembly for additional processing of the thermal image data.

In a further embodiment, a method of manufacture may be provided. The method of manufacture may include receiving an imager assembly with a focal plane array, a printed circuit board assembly, processing electronics communicatively connected to the focal plane array through the printed circuit board assembly and configured to receive and process the thermal image data, and a connector, coupling the imager assembly, via the connector, to supporting electronics, wherein the imager assembly is configured to output thermal image data to the supporting electronics via the connector and the supporting electronics is configured to further process the thermal image data, and assembling the imager assembly and the system processing component into an infrared camera An infrared imaging device may include a focal plane array and a sensor window packaged together and having backend electronics to receive and process thermal image data. For example, a wafer-level packaged (WLP) or pixel-level packaged (PLP) infrared sensor assembly may constitute one or a plurality of infrared sensors constituting the focal plane array packaged with the sensor window (e.g., an optical surface to the package). With the sensor window located in close proximity to the sensor array (e.g., the focal plane array).

In some embodiments, an infrared imaging device is constructed where the focal window or lens is not encased in additional body structure for the device. For example, some uses of the infrared imaging device may include different backend electronics for processing and/or different optics used with the device. However, without insuring that the windows and/or lens of the infrared imaging devices are free from environmental debris and damage, the resulting device may be suboptimal or insufficient to meet the needs of the required imaging use. In various embodiments, the sensor component may be manufactured in one facility, and a complete camera (e.g., including an encasing house and/or lens assembly) may be manufactured and/or assembled in another facility. In other embodiments, the sensor component may be field-replaced in an existing encasing housing and/or lens assembly.

The sensor window may be displaced a first distance from the focal plane where the sensor window is substantially in focus when viewed by the focal plane array. To protect the sensor window, a protective window is disposed over the optical surface and displaced at a second distance from the focal plane array, where the second distance is larger than the first distance and causes the surface of the protective window to be substantially or completely out of focus to the focal plane array. Thus, the protective window prevents environmental/atmospheric damage and debris from affecting the sensor window. As a result, image artifacts (e.g., blemishes) resulting from such damage and debris are substantially reduced or eliminated in thermal image data resulting from use of the infrared imaging device.

In one embodiment, a device comprises a focal plane array configured to capture thermal image data from a scene, a sensor window displaced a first distance from the focal plane array, and a protective window displaced a second distance greater than the first distance from the focal plane array, wherein the second distance causes damage or debris incident on the protective window to be out of focus in the thermal image data.

In another embodiment, a method comprises providing a focal plane array configured to capture thermal image data from a scene, providing a sensor window displaced at a first distance from the focal plane array, and providing a protective window displaced a second distance greater than the first distance from the focal plane array, wherein the second distance causes damage or debris incident on the protective window to be out of focus in the thermal image data.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
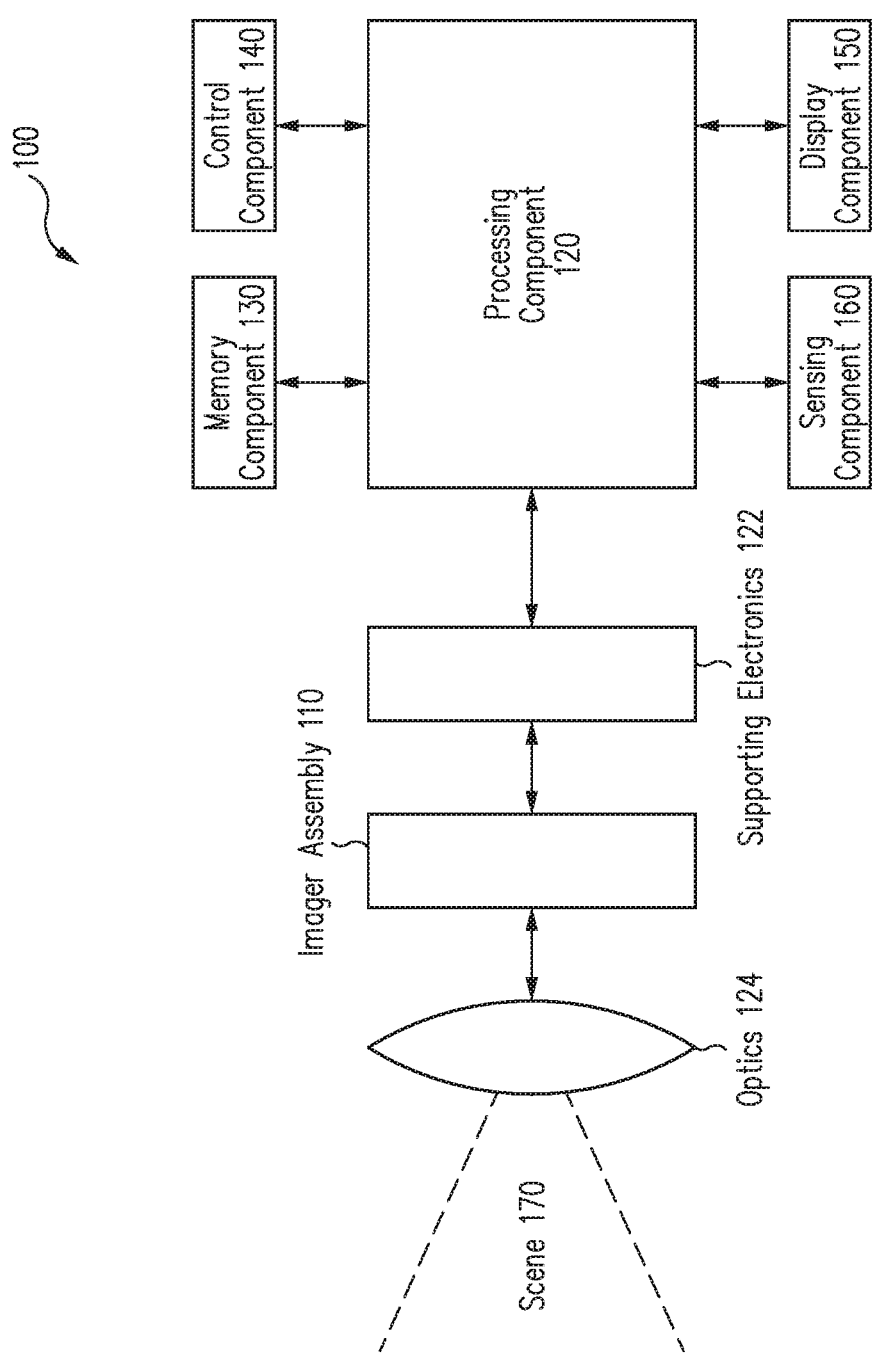
FIG. 1 illustrates a block diagram of a system for infrared imaging processing, according to an embodiment.

FIG. 1 shows a block diagram of a system 100 (e.g., an infrared imaging device or infrared camera) for infrared image capturing and processing in accordance with an embodiment. The system 100 comprises, in one implementation, an imager assembly 110, a processing component 120, a memory component 130, a control component 140, and a display component 150. In some embodiments, the system 100 may include supporting electronics 122, optics 124, and a sensing component 160

The system 100 may represent an infrared imaging system, such as an infrared camera and processing electronics, configured to capture and process thermal images, such as image and video images of a scene 170. The system 100 may represent any type of infrared camera adapted to detect infrared radiation and provide representative data and information (e.g., thermal infrared image data of a scene). For example, the system 100 may represent an infrared camera that is directed to the near, middle, and/or far infrared spectrums. In another example, the infrared image data may comprise non-uniform data (e.g., real image data that is not from a shutter or black body) of the scene 170, for processing. The system 100 may comprise a portable device and may be incorporated, e.g., into a vehicle (e.g., an automobile or other type of land-based vehicle, an aircraft, or a spacecraft) or a non-mobile installation requiring infrared images to be stored and/or displayed.

In various embodiments, system 100 comprises an imager assembly 110 configured to capture infrared image data. In this respect, imager assembly 110 comprises, in one embodiment, one or more infrared sensors (e.g., any type of multi-pixel infrared detector, such as a focal plane array) for capturing infrared image data (e.g., still image data and/or video data) representative of an image, such as scene 170. Imager assembly 110 may include, in one part, a wafer-level packaged (WLP) or pixel-level packaged (PLP) sensor having a sensor window (e.g., an optical surface). In order to protect the sensor window or optical surface from exposure and thus damage and debris, imager assembly 110 may further include a protective window configured to be out of focus to the sensor assembly, as will be explained in more detail herein.

Imager assembly 110 may further include processing electronics configured to receive, process, transmit, and/or record thermal image data received from the sensor assembly (e.g., the focal plane array). In one aspect, the infrared image data (e.g., infrared video data) may comprise non-uniform data (e.g., real image data) of an image, such as scene 170. The processing component 120 may be adapted to process the infrared image data (e.g., to provide processed image data), store the infrared image data in the memory component 130, and/or retrieve stored infrared image data from the memory component 130. For example, the processing component 120 may be adapted to process infrared image data stored in the memory component 130 and provide processed image data and information (e.g., captured and/or processed infrared image data).

In various embodiments, the processing component 120 comprises a processor, such as one or more of a microprocessor, a single-core processor, a multi-core processor, a microcontroller, a logic device (e.g., a programmable logic device (PLD) configured to perform processing functions), a digital signal processing (DSP) device, or other processing device. The processing component 120 may be adapted to interface and communicate with the components 122, 124, 130, 140, 150, and 160 to perform method and processing steps and/or operations, as described herein. In one aspect, the processing component 120 may be adapted to perform various other image processes including noise reduction and scaling the infrared image data.

In order to further receive, process, and transmit infrared image data, the system 100 may include the supporting electronics 122 and the optics 124. The supporting electronics 122 may be configured to provide additional processing of infrared image data, including adjustment of infrared imaging device temperature and capture temperature range (e.g., temperature and capture temperature of the imager assembly 110), gain, resolution, and/or adjustment of the optics 124. The optics 124 may be provided to the imager assembly 110 in order to provide various optical abilities and/or options to the system 100, including zoom, resolution, focus, or other optical function. The processing component 120 and the supporting electronics 122 may access and manipulate the optics 124 to provide various features to the system 100. Processes, implemented, for example, by software instructions, may be accessed by the processing component 120 and/or the supporting electronics 122 to provide such features.

It should be appreciated that various processes may be integrated in software and/or hardware as part of the processing component 120, with code (e.g., software or configuration data) stored, for example, in the memory component 130. Embodiments of the software and/or processes, as disclosed herein, may also be stored by a separate computer-readable medium (e.g., a memory, such as a hard drive, a compact disk, a digital video disk, or a flash memory) to be executed by a computer (e.g., a logic or processor-based system) to perform various methods and operations disclosed herein. In one aspect, the computer-readable medium may be portable and/or located separate from the system 100, with the processes and software provided to the system 100 by coupling the computer-readable medium to the system 100 and/or by the system 100 downloading (e.g., via a wired link and/or a wireless link) the processes and software from the computer-readable medium.

The memory component 130 comprises, in one embodiment, one or more memory devices adapted to store data and information, including infrared image data and information (e.g., metadata for the infrared image data). The memory device 120 may comprise one or more various types of memory devices including volatile and non-volatile memory devices, such as RAM (Random Access Memory), ROM (Read-Only Memory), EEPROM (Electrically-Erasable Read-Only Memory), flash memory, or other storage device/mechanism. The processing component 120 may be adapted to execute software stored in the memory component 130 so as to perform method and process steps and/or operations described herein.

The control component 140 comprises, in one embodiment, a user input and/or interface device, such as a rotatable knob (e.g., potentiometer), push buttons, slide bar, keyboard, or other input/output device, that is adapted to generate a user input control signal. The processing component 120 may be adapted to sense control input signals from a user via the control component 140 and respond to any sensed control input signals received therefrom. The processing component 120 may be adapted to interpret such a control input signal as a value, as generally understood by one skilled in the art.

In one embodiment, the control component 140 may comprise a control unit (e.g., a wired or wireless handheld control unit) having push buttons adapted to interface with a user and receive user input control values. In one implementation, the push buttons of the control unit may be used to control various functions of the system 100, such as autofocus, menu enable and selection, field of view, brightness, contrast, noise filtering, high pass filtering, low pass filtering, and/or various other features as understood by one skilled in the art. The control component 140 may further be configured to access and manipulate the supporting electronics 122 and the optics 124 to provide the aforementioned functions.

The display component 150 comprises, in one embodiment, an image display device (e.g., a liquid crystal display (LCD)) or various other types of generally known video displays or monitors. The processing component 120 may be adapted to display image data and information on the display component 150. The processing component 120 may be adapted to retrieve image data and information from the memory component 130 and display any retrieved image data and information on the display component 150. The display component 150 may comprise display electronics, which may be utilized by the processing component 120 to display image data and information (e.g., infrared images). The display component 150 may be adapted to receive image data and information directly from the image capture component 130 via the processing component 120, or the image data and information may be transferred from the memory component 130 via the processing component 120.

The sensing component 160 comprises, in one embodiment, one or more sensors of various types, depending on the application or implementation requirements, as would be understood by one skilled in the art. The sensors of the sensing component 160 provide data and/or information to at least the processing component 120. In one aspect, the processing component 120 may be adapted to communicate with the sensing component 160 (e.g., by receiving sensor information from the sensing component 160) and with the imager assembly 110 (e.g., by receiving data and information from the imager assembly 110 and providing and/or receiving command, control, and/or other information to and/or from one or more other components of the system 100).

In various implementations, the sensing component 160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. The sensing component 160 may represent conventional sensors as generally known by one skilled in the art for monitoring various conditions (e.g., environmental conditions) that may have an effect (e.g., on the image appearance) on the data provided by the imager assembly 110.

In some implementations, the sensing component 160 (e.g., one or more of sensors) may comprise devices that relay information to the processing component 120 via wired and/or wireless communication. For example, the sensing component 160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of the system 100 may be combined and/or implemented or not, as desired or depending on the application or requirements, with the system 100 representing various functional blocks of a related system. In one example, the processing component 120 may be combined with the imager assembly, the support electronics 122, the optics 124, the memory component 130, the display component 150, and/or the sensing component 160. In another example, the processing component 120 may be combined with the imager assembly 110 with only certain functions of the processing component 120 performed by circuitry (e.g., a processor, a microprocessor, a logic device, and/or a microcontroller) within the imager assembly 110. Furthermore, various components of the system 100 may be remote from each other (e.g., the supporting electronics 122 may comprise a remote sensor with processing component 120 representing a computer that may or may not be in communication with the imager assembly 110).

Figure 2A:
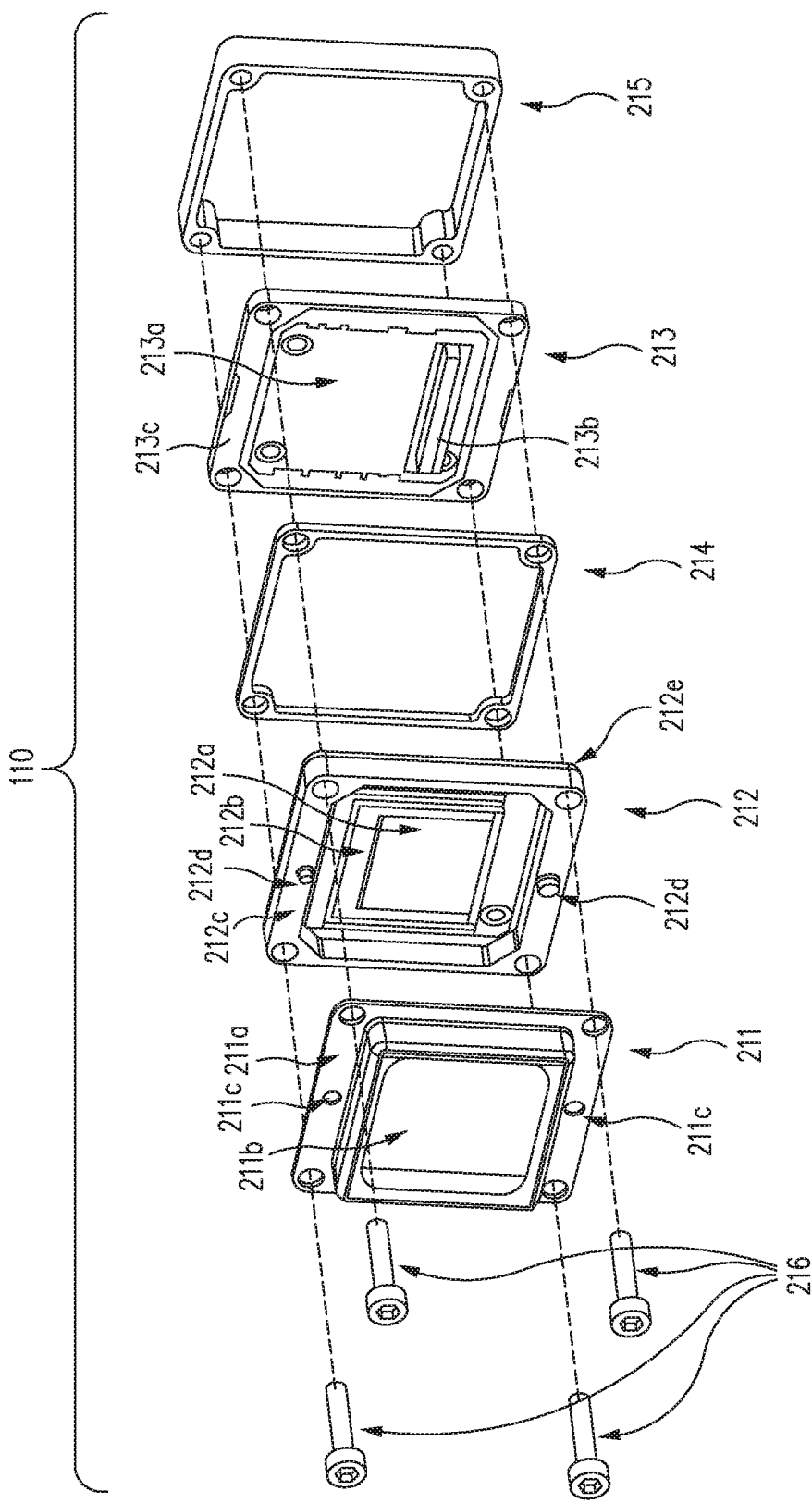
FIG. 2A illustrates an exploded view of an imager assembly with a protective window assembly, according to an embodiment.

FIG. 2A illustrates an exploded view of an imager assembly 110 with a protective window assembly 211, according to an embodiment. The imager assembly 110 of FIG. 1 is shown expanded into various parts that may be utilized as imager assembly 110. Thus, imager assembly 110 is shown with the protective window assembly 211, a sensor/window assembly 212, electronics 213, a first spacer 214, a second spacer 215, and an attachment mechanism 216. In other embodiments, more or less components may be used to implement imager assembly 110.

The protective window is constructed using a frame 211a that provides an attachment to the sensor/window assembly 212. The protective window assembly 211 may further include a window 211b that is at least transmissive in the desired waveband and configured to be durable. The window 211b may be constructed of a material such as silicon, germanium, zinc selenide, chalcogenate glass, plastics, polymers, sapphire, and/or other material as appropriate. The frame 211a may be constructed of a material having a coefficient of thermal expansion (CTE) matching or similar to that of the material of the window 211b. In other embodiments, a low stress (e.g., flexible) adhesive is used to bond the frame 211a and the window 211b to compensate for a CTE mismatch between the frame 211a and the window 211b. The window 211b is offset from the frame 211a so that the window 211b is not flush with the base of the frame 211a (e.g., is raised or extended some height from the flanged base of frame the 211a). Additionally, the frame 211a may include holes, threads, or other fastener for the attachment mechanism 216, or the attachment mechanism 216 may correspond to a glue, epoxy or ZYMET (which may also be used to bond the window 211b to the frame 211a) so that the frame 211a is substantially free from additional holes, threads, or other physical fastening mechanism. Thus, the attachment mechanism 216 may use various forms of chemical and/or mechanical attachments as required. The frame 211a may further include an alignment aperture 211c that may be configured to attach, mate, or otherwise assist in alignment with one or more other units of the imager assembly 110.

The sensor/window assembly 212 for the imager assembly 110 may include a focal plane array 212a and a sensor window 212b. Focal plane array 212a may include a plurality of infrared detectors implemented in an array or other fashion on a PCB 212e (e.g., a substrate configured to accept the focal plane array 212a). The infrared detectors may be configured to detect incoming infrared radiation (e.g., infrared energy) from scene 170 including, for example, mid wave infrared wave bands (MWIR), long wave infrared wave bands (LWIR), and/or other thermal imaging bands as may be desired in particular embodiments. The infrared detectors may be implemented, for example, as infrared photodetectors, bolometer/microbolometers, or other types of thermal imaging infrared detectors arranged in any desired array pattern to provide a plurality of pixels.

The focal plane array 212a may be implemented, for example, as a vacuum package assembly (e.g., sealed with sensor window 212b). In various embodiments, the focal plane array 212a and the sensor window 212b may be formed/fabricated using wafer level packaging techniques. For example, the focal plane array 212a and the sensor window 212b may constitute a WLP or PLP sensor assembly configured to detect thermal image data.

As previously stated, the focal plane array 212a may comprise one or more infrared detectors configured as infrared sensors for capturing infrared image data (e.g., still image data and/or video data) representative of an image, such as scene 170 of FIG. 1. In one implementation, the infrared detectors of the focal plane array 212a provide for representing (e.g., converting) the captured thermal image radiation as digital data (e.g., via an analog-to-digital converter included as part of the imager assembly 110 or separate from the imager assembly as part of the system 100, e.g., supporting electronics 122 of FIG. 1). Thus, as previously discussed, the infrared image data (e.g., infrared video data) may comprise non-uniform data (e.g., real image data) of an image, such as scene 170. The processing component 110 of FIG. 1 may be adapted to process the infrared image data (e.g., to provide processed image data), store the infrared image data in the memory component 130, and/or retrieve stored infrared image data from the memory component 130, as previously discussed.

The sensor window 212b may constitute a window for the focal plane array 212a that is transmissive to thermal/infrared radiation and within the spectral band of the focal plane array. The sensor window 212b may act as a transmissive window that allows incoming infrared radiation to pass and be detected by the focal plane array 212a. In embodiments, the sensor window 212b may act as a focusing optic for the focal plane array 212a. It is desirable that the sensor window 212b be free or substantially free from defects, damage, and debris collection to insure no inconsistencies and/or blemishes are produced during image formation of an infrared scene (e.g., of received thermal/infrared radiation). The focal plane array 212a and the sensor window 212b may be held in place by insetting the package within a frame 212c. Moreover, the frame 212c includes at least one alignment pin 212d that may join with the alignment aperture 211c to insure proper alignment of the protective window assembly 211 and the sensor/window assembly 212. The alignment aperture 211c may be oversized as there may be no strict alignment requirements where the protective window assembly 211 does not provide optical power and/or focus (e.g., where the protective window assembly 211 provides on transmission of the desired waveband and does not produce optical characteristics). Thus, the alignment pin 212d may instead be utilized with further lenses and/or optics in order to provide additional optical characteristics for the imager assembly 110. However, if protective window assembly 211 instead provides optical power and/or characteristics (e.g., may provide some level of focus), the alignment pin 212d and the alignment aperture 211c may instead provide for true alignment of the protective window assembly 211.

The imager assembly 110 further includes electronics 213 that may connect to the sensor/window assembly 212 and receive, process, and/or transmit thermal image data captured by the sensor/window assembly 212. In this regard, the electronics 213 may calibrate the sensor/window assembly 212 in order to receive and provide interpretable (e.g., readable) thermal still and/or video images. Thus, the electronics 213 may adjust the sensor/window assembly 212 and/or the focal plane array 212a so that received thermal radiation by the sensor/window assembly 212 and the focal plane array 212a can be collected to form an image of a scene. In some embodiments, the electronics 213 include a field-programmable gate array 213a that may include an integrated circuit containing the hardware and software logic to perform the aforementioned operations. The electronics 213 also includes at least one connector 213b configured to connect to the sensor/window assembly 212 (e.g., the focal plane array 212a) and/or supporting electronics and logic that may integrate imager assembly 110 into a system (e.g., system 100). The electronics 213 may be formed with or incorporated in a frame 213b, similar to frame 211a and frame 212c.

Imager assembly 110 may further include a spacers 214 and 215. In various embodiments, the spacer 214 is placed between the sensor/window assembly 212 and the electronics 213 in order to provide sufficient space and/or act a buffer to protect sensitive components of the sensor/window assembly 212 and the electronics 213. For example, the spacer 214 may provide for sufficient height so that contact between the sensor/window assembly 212 and the electronics 213 does not damage the focal plane array 212a, the FPGA 213a, and/or the connector 213b. In various embodiments, the spacer 214 may provide an additional height that may be added to frame 212c and/or frame 213c. Similarly, the spacer 215 may be provided so as to provide additional space, height, and/or buffer area to protect the FPGA 213a and/or the connector 213b that connects to additional supporting electronics and logic. In some embodiments, the spacers 214 and 215 may be formed of material similar to the frames 211a, 212c, and 213c. The above described components may also be sealed and/or held together using the attachment mechanism 216. Although the attachment mechanism 216 is shown as bolts, screws, or other mechanical/physical fasteners, the attachment mechanism 216 may also comprise glue, epoxy, sealers and/or sealants, or other chemical bonding mechanism. For example, one type of attachment mechanism 216 may be ZYMET.

Figure 2B:
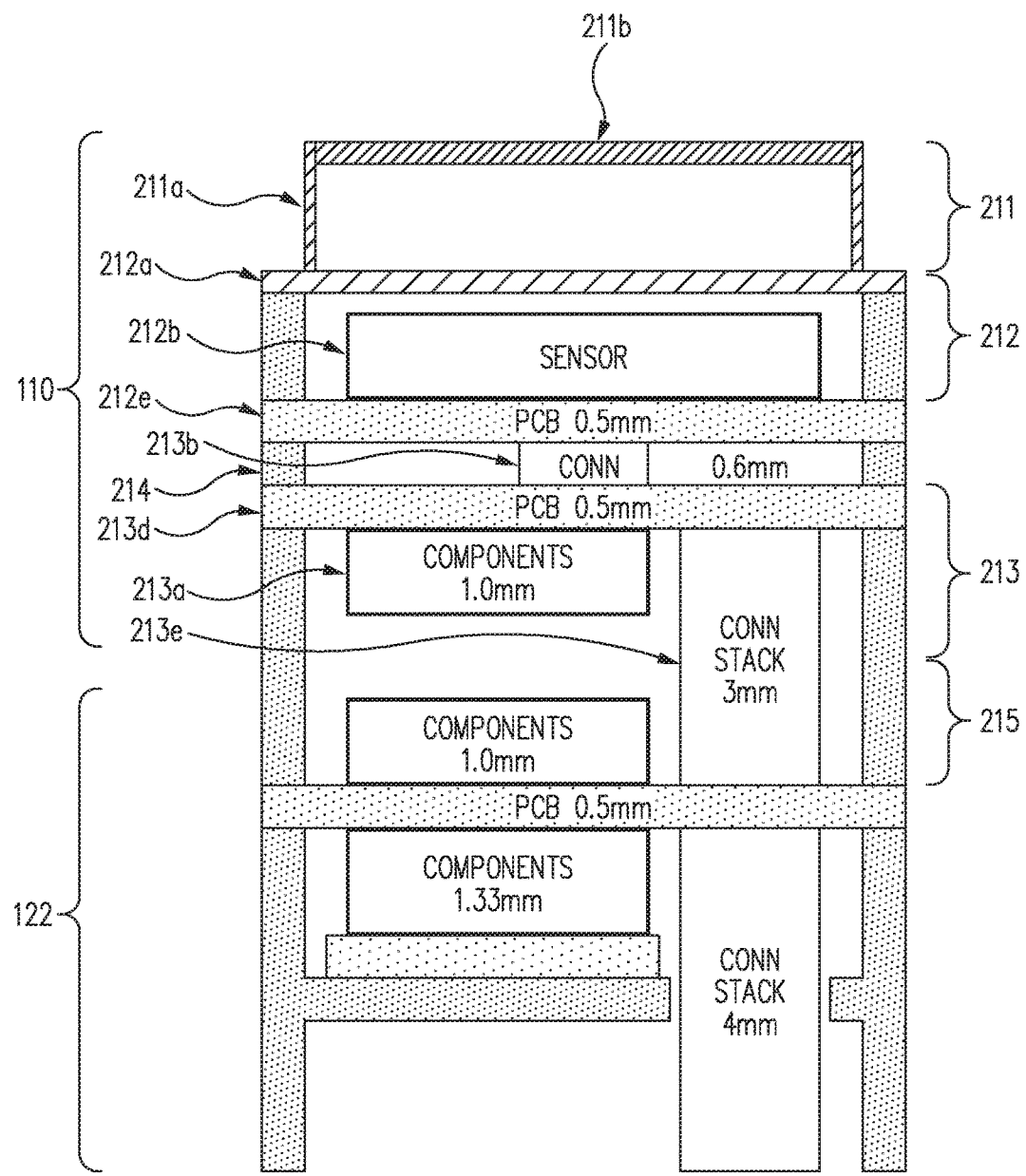
FIG. 2B illustrates an abstract block diagram of a constructed imager assembly having a protective window assembly shown in FIG. 2A, according to an embodiment.

FIG. 2B illustrates an abstract block diagram of a constructed imager assembly 110 having a protective window assembly 211 shown in FIG. 2A, according to an embodiment. In this regard, FIG. 2B shows a structural layout of the imager assembly 110. The imager assembly 110 is shown with the protective window assembly 211, the sensor/window assembly 212, and the electronics 213. Additionally, the imager assembly 110 is shown with the spacers 214 and 215.

FIG. 2B features a cutaway of the imager assembly 110 and portrayed through a block diagram. In relevant parts, the imager assembly 110 shows the protective window assembly 211 encapsulating the sensor/window assembly 212 with a window 211b disposed a distance above the sensor/window assembly 212. The protective window assembly 211 includes the frame 211a that extends the window 211b to a height/distance away from the sensor/window assembly 212, and specifically the sensor window 212b of the sensor/window assembly 212. The sensor window 212b is shown displayed above the focal plane array 212a so that the sensor window 212b is a closer distance to the focal plane array 212a and within a focal plane/focus of the focal plane array 212a. The focal plane array 212a is shown disposed on a printed circuit board (PCD) 212e that holds the infrared sensors of the focal plane array 212a in place and allows a connection to be established for receiving thermal image data detected by the focal plane array 212a. Additionally, it is shown that the window 211b of the protective window assembly 211 unit is displaced far enough away from the sensor/window assembly 212 that the window 211b, and therefore damage and debris to the window 211b, is not in focus of the sensor/window assembly 212.

Connected to the sensor/window assembly 212 are the electronics 213 through the at least one connector 213b. The electronics 213 are shown as FPGA 213a attached to a backside of a PCB 213d to prevent interference and damage to and by the sensor/window assembly 212 and/or the PCB 212e of the sensor/window assembly 212 and/or the PCB 213d the electronics 213. Moreover, the spacer 214 is shown to give additional height/room to prevent contact and damage between the sensor/window assembly 212 and the electronics 213. Spacer 215 may similarly give additional room to enable a connection (e.g., using a connection 213e) between the electronics 213 and the supporting electronics 122 without damage to either unit. Thus, the connection 213e on the bottom side of PCB 213d may be utilized to connect to the supporting electronics 122.

Figure 3:
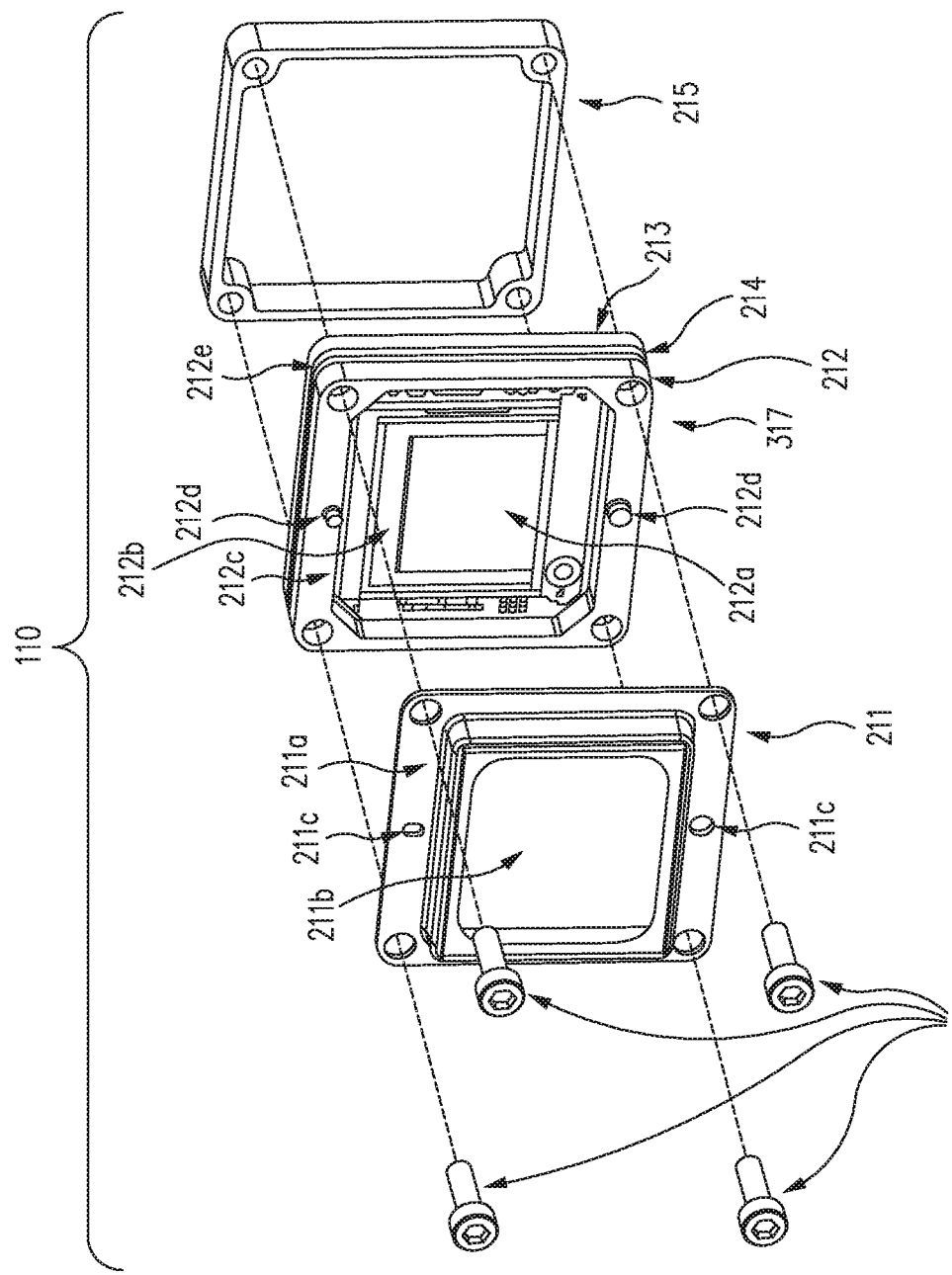
FIG. 3 illustrates an exploded view of a packaged thermal imaging unit and a protective window assembly for attachment to the packaged thermal imaging unit, according to an embodiment.

FIG. 3 illustrates an exploded view of a thermal imaging unit 317 and a protective window assembly 211 for attachment to the thermal imaging unit 317, according to an embodiment. Imager assembly 110 is shown with connection of the various components, such as after providing, constructing, and connecting the sensor/window assembly 212 and the electronics 213, with the spacer 214 between the sensor/window assembly 212 and the electronics 213, to form the thermal imaging unit 317 as packaged together.

However, the thermal imaging unit 317 may further connect with the protective window assembly 211 to prevent damage and debris to the sensor window 212b. For example, the thermal imaging unit 317 (including the sub-parts of the thermal imaging unit 317, e.g., the sensor/window assembly 212, the electronics 213, and the spacer 214) may be constructed and/or connected in a "clean" room or other optimal conditions to prevent environmental and/or atmospheric damage to the sensor window 212b. However, as removal from these optimal conditions may still cause damage to the exposed sensor window 212b, FIG. 3 shows a joining of the protective window assembly 211 to the thermal imaging unit 317 prior to exposure of the thermal imaging unit 317 to such environmental factors.

Thus, the protective window assembly 211 may be joined to the thermal imaging unit 317 in the "clean" room or other environment that may limit or eliminate flaws on the sensor window 212b caused by dust, debris, or damage to the sensor window 212b. The protective window 212 may be aligned with the thermal imaging unit 317 using the alignment aperture 211c in the frame 211a with the alignment pin 212a in the frame 212c. The window 211b may then provide the cover for the sensor window 212b. Additionally, when joining the protective window assembly 211 and the thermal imaging unit 317, the attachment mechanism 216 may be utilized and the spacer 215 may be attached.

Figure 4:
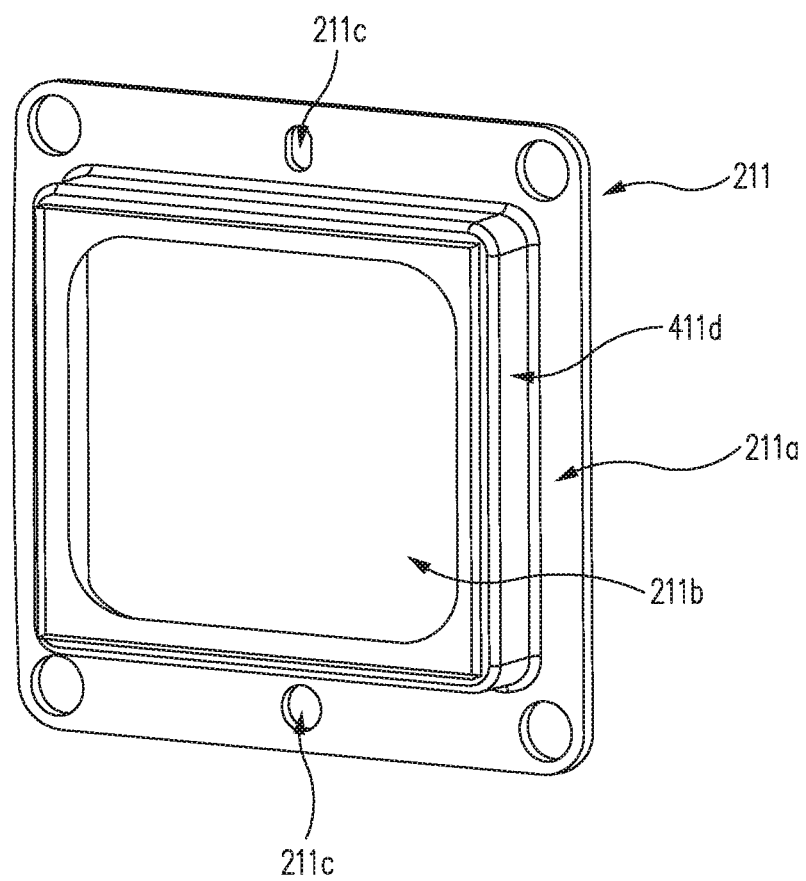
FIG. 4 illustrates an exemplary protective window assembly for an infrared imaging device, according to an embodiment.

FIG. 4 illustrates an exemplary protective window assembly 211 for an infrared imaging device, according to an embodiment. The protective window assembly 211 is shown absent the thermal imaging unit 317 of the imager assembly 110. As shown with respect to the protective window assembly 211, the frame 211a includes a flange 411d that extends to a height to offset the window 211b and accommodate a sufficient height to keep the window 211b out of focus from the sensor/window assembly 212 (and in particular the focal plane array 212a). The height of the flange 411d is shown and discussed in more detail with respect to numeral 684a of FIG. 6C. The frame 211a is further shown with an alignment aperture 211c used for alignment of the protective window assembly 211 with the thermal imaging unit 317 using the alignment pin 212d. As previously discussed, in various embodiments, the alignment pin 212d may provide alignment between the thermal imaging unit 317 and additional optics (e.g., the optics 124 of FIG. 1).

Figure 5A:
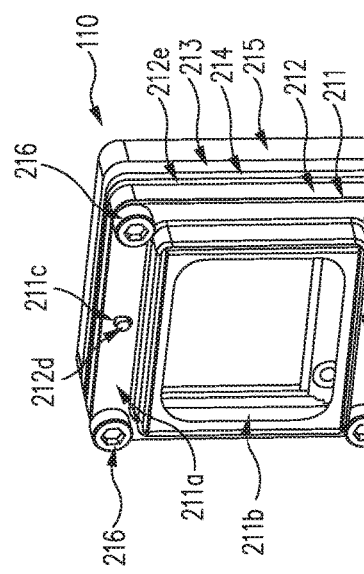
FIGS. 5A-C illustrate three views of a constructed infrared imaging device having a protective window assembly, according to an embodiment.
Figure 5C:
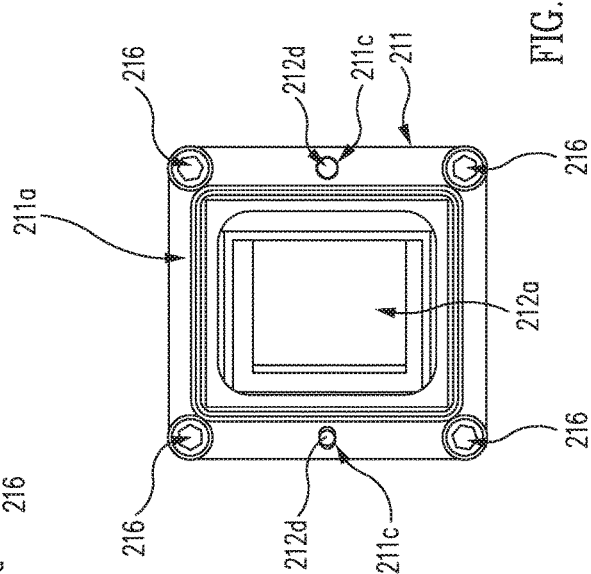
Figure 5B:
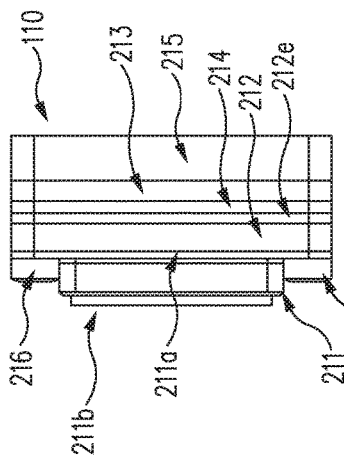

FIGS. 5A-C illustrate three views of a constructed imager assembly 110 having a protective window assembly 211, according to an embodiment. FIGS. 5A-5C show multiple perspectives of imager assembly 110 after connection of the various separate parts of imager assembly 110. For example, FIG. 5A shows a tilted view of imager assembly 110 with the constituent parts individually marked. Thus, starting from the left side of imager assembly 110 in FIG. 5A, the protective window assembly 211 is shown as connected/bonded to the sensor/window assembly 212, which features the PCB 212e with the attached focal plane array 212a (not shown in FIG. 5A) connected to the right. Further connected to the PCB 212e is the spacer 214 configured to provide room to connect the electronics 213 with the PCB 212e and thus the focal plane array 212a of the sensor/window assembly 212. Connected further to the electronics 213 at the furthest right is the spacer 215.

Imager assembly in FIG. 5A is connected using an attachment mechanism 216, shown as bolts or screws in FIG. 5A. However, other embodiments may use different bonding mechanisms, such as snaps, interlocking pieces, adhesives, or other fasteners. The protective window assembly 211 is aligned with the sensor/window assembly 212 using the alignment aperture 211c of the frame 211a and the alignment pin 212d on the sensor/window assembly 212. Once the bonding is complete, the window 211b prevents damage, debris, or other flaws from the sensor/window assembly 212.

FIG. 5B presents a side view of the above described imager assembly 110. Thus, as shown in FIG. 5B, the imager assembly 110 includes the protective window assembly 211 attached to the sensor/window assembly 212 having PCB 212e, which is further connected to electronics 213 (e.g., using the at least one connection 213b of FIGS. 2A and 2B). To provide spacing between PCB 212e and electronics 213 is the spacer 214. Further attached to the right side of electronics 213 is the spacer 215 in order to protect an FPGA of electronics 213 (e.g., FPGA 213a of FIGS. 2A and 2B). Again shown in FIG. 5B is the attachment mechanism 216 utilized to bind and seal the imager assembly 110. From the side perspective, the frame 211a can be shown with an offset height in the left direction to displace the window 211b some distance from the focal plane array of sensor/window assembly 212.

FIG. 5C presents a view of the above described imager assembly 110 as seen through the protective window assembly 211, e.g., from a scene captured by the imager assembly 110. The window 211b of the protective window assembly 211 is shown covering the sensor window 212b and thereby protecting the sensor window 212b. Moreover, the frame 211a is shown aligned with the rest of the imager assembly 110 through matching the alignment aperture 211c of the frame 211a with the alignment pin 212d. Finally shown bonding the imager assembly 110 together is the attachment mechanism 216.

Figure 6A:
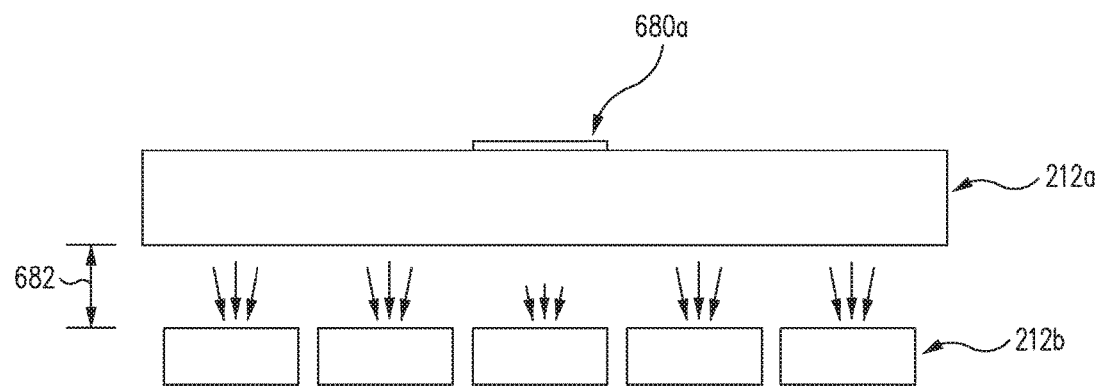
FIGS. 6A and B illustrate exemplary damage or debris on a sensor window according to the present disclosure with resulting thermal image data, according to an embodiment.

FIGS. 6A and B illustrate exemplary damage or debris on a sensor window 212a according to the present disclosure with resulting thermal image data, according to an embodiment. FIG. 6A shows an abstraction of a partial sensor/window assembly, e.g., sensor/window assembly 212 of FIGS. 2A and 2B, shown with the functional parts of the sensor window 212b and the focal plane array 212a. FIG. 6A is shown without the protective window assembly 211 and in particular the window 211b providing protection to the sensor window 212b and focal plane array 212a of the imager assembly 110. Additionally, the sensor window 212b and the focal plane array 212a are separated by a first distance 682. The first distance 682 may be a distance sufficiently small such that the sensor window 212b remains within focus/the focal plane of the focal plane array 212a. For example, the sensor window 212b may act as a first optic to focus the incoming thermal image radiation to the focal plane array 212a.

The sensor window 212b in FIG. 6A is shown with a flaw 680a. The flaw 680a may correspond to an environmental or atmospheric damage or debris to the sensor window 212b. The flaw 680a may also correspond to a flaw caused by improper handling of the sensor window 212b or by other optics, electronics, or parts coming into contact with the sensor window 212b with sufficient force to cause the flaw 680a. Thus, the flaw 680a may correspond to a flaw, irregularity, damage, debris, or other imperfection caused after fabrication of the sensor window 212b that causes an image artifact in resulting image data. Thus, the flaw 680a may correspond any post manufacturing irregularity on the sensor window 212b, e.g., the flaw 680a does not exist at the time of fabrication of the sensor window 212b and is not taken into account for the transmissivity, clarity, and optical properties of the sensor window 212b.

Figure 6B:
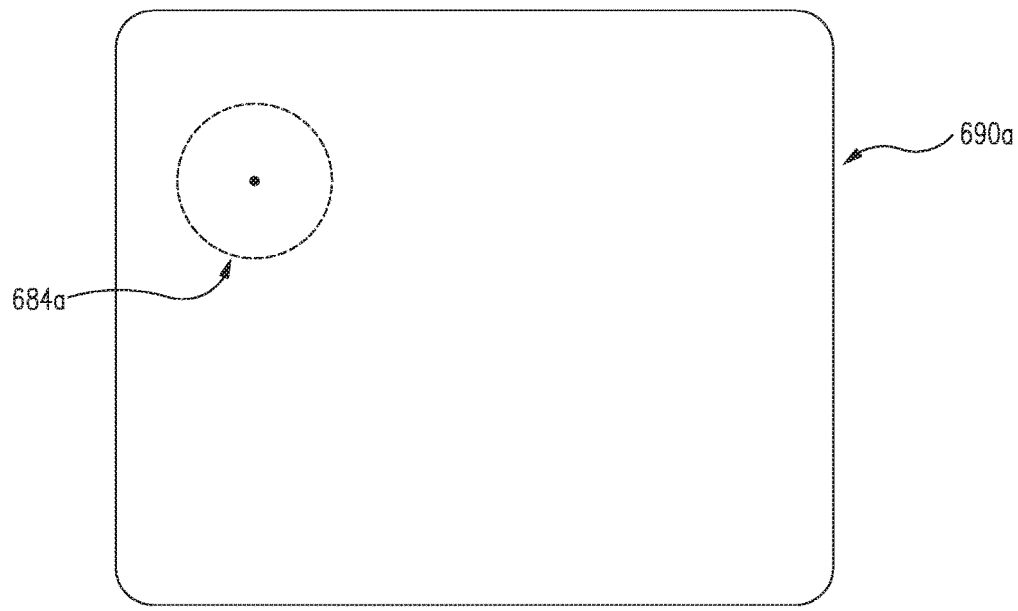
FIGS. 6C and D illustrate exemplary damage or debris on a protective window according to the present disclosure with resulting thermal image data, according to an embodiment.

Since the sensor window 212b is within the focus of the focal plane array 212a or focuses the incoming thermal image radiation for the focal plane array 212a due to the first distance 682 between the sensor window 212b and the focal plane array 212a, the flaw 680a becomes visible in resulting thermal image data captured by the focal plane array 212a. The resulting thermal image data is shown in FIG. 6B as it would appear displayed to a user. Thus, a thermal image data display 690a of a scene is shown with an inconsistency 684a as a result of the flaw 680a from FIG. 6A. In essence, this causes the thermal image data display 690a to display image artifacts (e.g., irregularities) that are not within thermal image radiation of a scene that is captured by the focal plane array 212a. Furthermore, the inconsistency 684a can lead to calibration errors of the imager assembly 110.

Figure 6C:
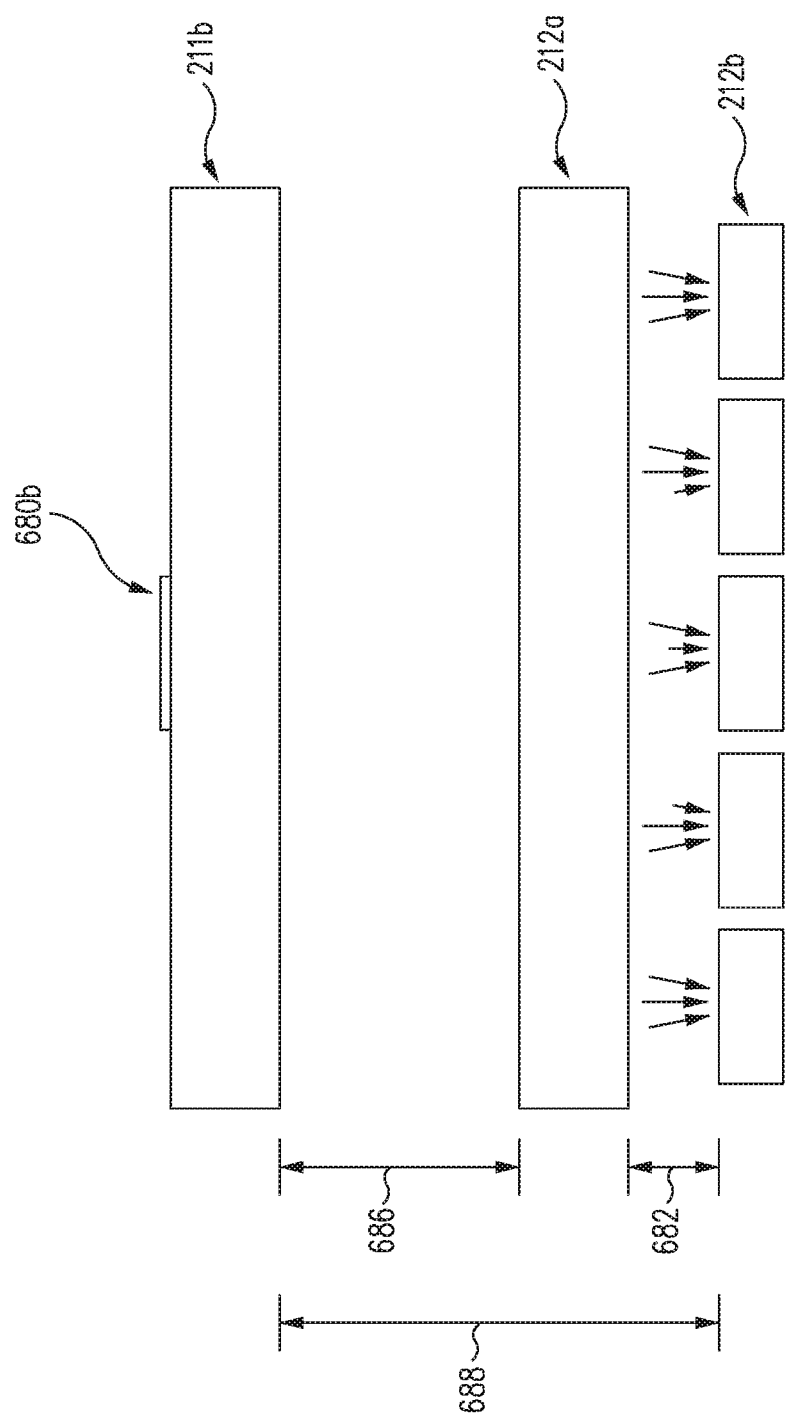

FIGS. 6C and D illustrate exemplary damage or debris on a protective window 211b according to the present disclosure with resulting thermal image data, according to an embodiment. FIG. 6C shows an abstraction of a partial imager assembly, e.g., imager assembly 110 of FIGS. 2A and 2B, shown with the functional parts of the sensor window 212b and the focal plane array 212a, however, with the sensor window 212b protected by the window 211b of the protective window assembly 211 unit. The sensor window 212b and the focal plane array 212a are again separated by a first distance 684a that may comprise some distance where the sensor window 212b acts as a focusing optic for the focal plane array 212a, or the sensor window 212b is still within focus of the focal plane array 212a. However, in the embodiments shown in FIG. 6C, the window 211b of the protective window assembly 211 is separated by a second distance 686. The second distance 686 may be configured so that the window 211a is not or is only slightly in focus to the focal plane array 212a, and thus any damage, debris, or flaws on the window 211a is not reflected in thermal image data captured by the focal plane array 212a. Thus, the second distance 686 is some distance greater than the first distance 682. As shown in FIG. 6C, the second distance 686 is larger than the first distance 684a comparatively. However, a range of distances may be utilized for the second distance 686 so long as the second distance 686 attributes to the aforementioned features between the window 211a and the focal plane array 212a (e.g., flaws to the window 211a are out of focus to the focal plane array 212a or the sensor window 212b).

A flaw 680b is shown in FIG. 6C on the window 211b. The flaw 680b may correspond to the flaw 680a, such as a flaw caused by damage, environment/atmospheric debris, or other damage/debris caused post-manufacturing of the window 211b. However, and as will be shown in thermal image data display 690b, the flaw does not show up as an inconsistency in the thermal image data due to the window 211b and the second distance 686 between the window 211b and the sensor window 212b/the focal plane array 212a. In certain embodiments, the second distance may be greater than approximately 0.025. However, larger flaws may cause image artifacts, inconsistencies, or irregularities in the thermal image data. Thus, a larger distance of greater than approximately 0.060 may be used in other embodiments.

Figure 6D:
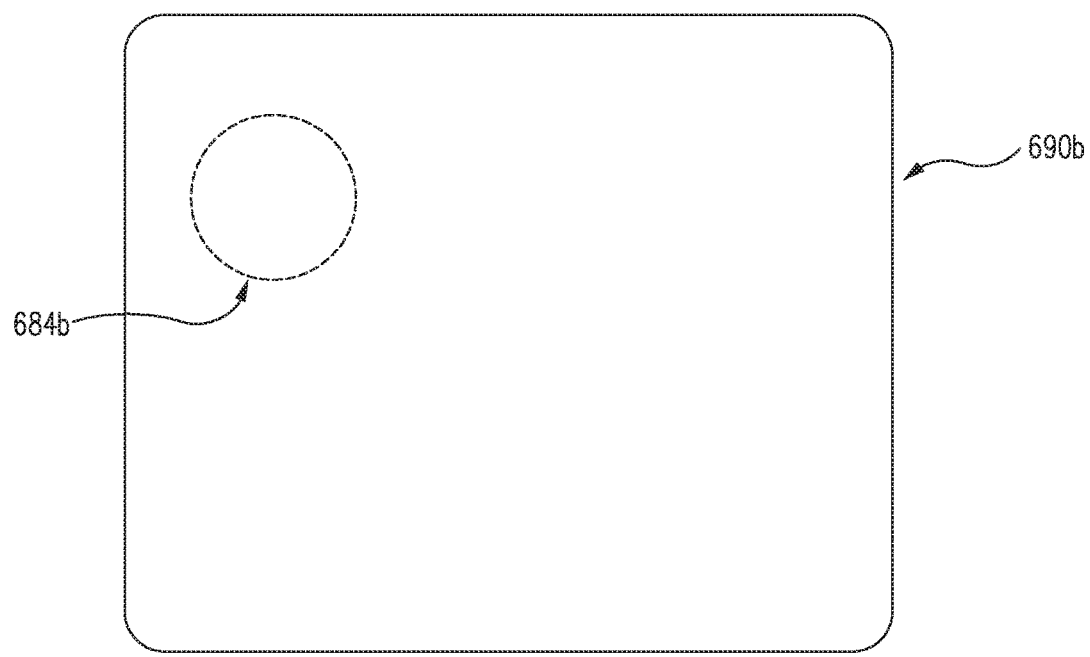

Thermal image radiation captured by the focal plane array 212a of FIG. 6C is shown on a display in FIG. 6D. Thus, FIG. 6D displays a thermal image data display 690b resulting from the thermal image data. However, in contrast to FIG. 6C, which shows the inconsistency 684a in the thermal image data display 690a when the flaw 680a is on the sensor window 212b, the thermal image data display 690b does not show the inconsistency 684a. Thus, an area 684b is free from the image artifact (e.g., inconsistency or irregularity) caused by the flaw 680b on the window 211b. This is due to the window 211b being the second distance 686 from the sensor window 212b.

Figure 7A:
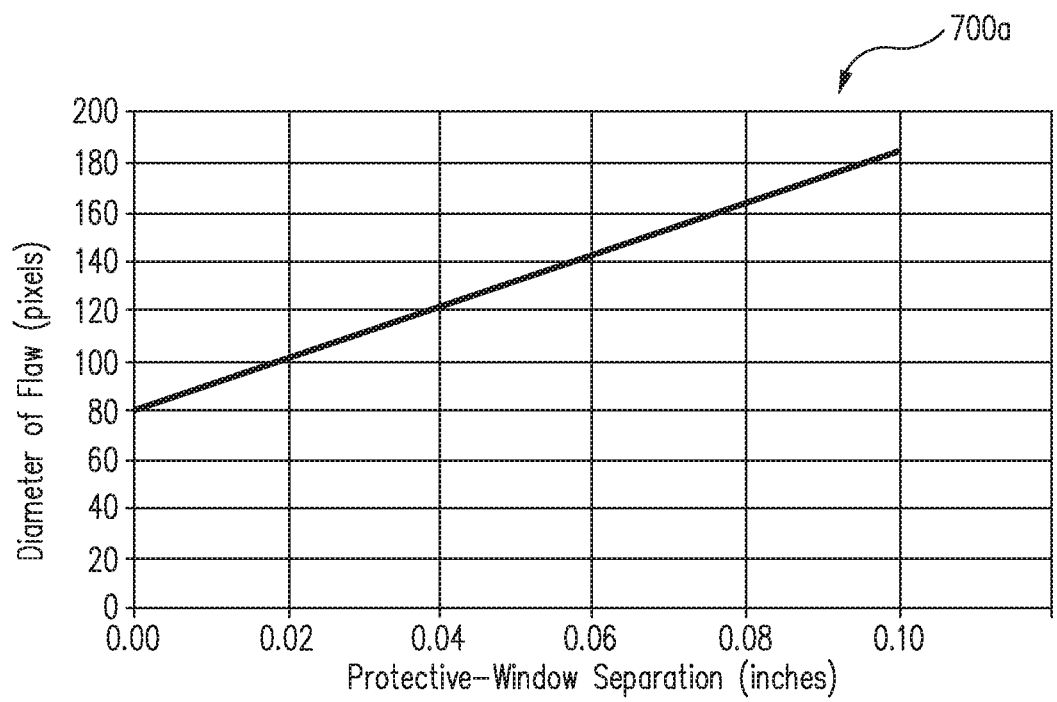
FIG. 7A illustrates comparative flaw pixel size in resulting thermal image data for increasing distance between a protective window and a sensor window, according to an embodiment.

FIG. 7A illustrates comparative flaw size and distance from a sensor window compared to flaw intensity in the resulting thermal image data, according to an embodiment. In FIG. 7A, graph 700a shows the relative size of the flaw 680b to the window 211b and the comparative distance the window 211b should be from the sensor window 212b in order to prevent the flaw 680b from causing errors in the resulting thermal image data. As shown, the diameter of the flaw 680b (e.g., in number of pixels of the resulting thermal image data) increases proportionally (e.g., linearly as shown in FIG. 7A, or otherwise) to the separation distance (e.g., in inches) between the window 211b and sensor window 212b. A small diameter flaw therefore requires less separation distance between the window 211b and the sensor window 212b to be negligible in the resulting thermal image data. In contrast, larger diameter flaws require larger separation between the window 211b and the sensor window 212b otherwise the flaw on the window 211b will remain visible in the resulting thermal image data.

Figure 7B:
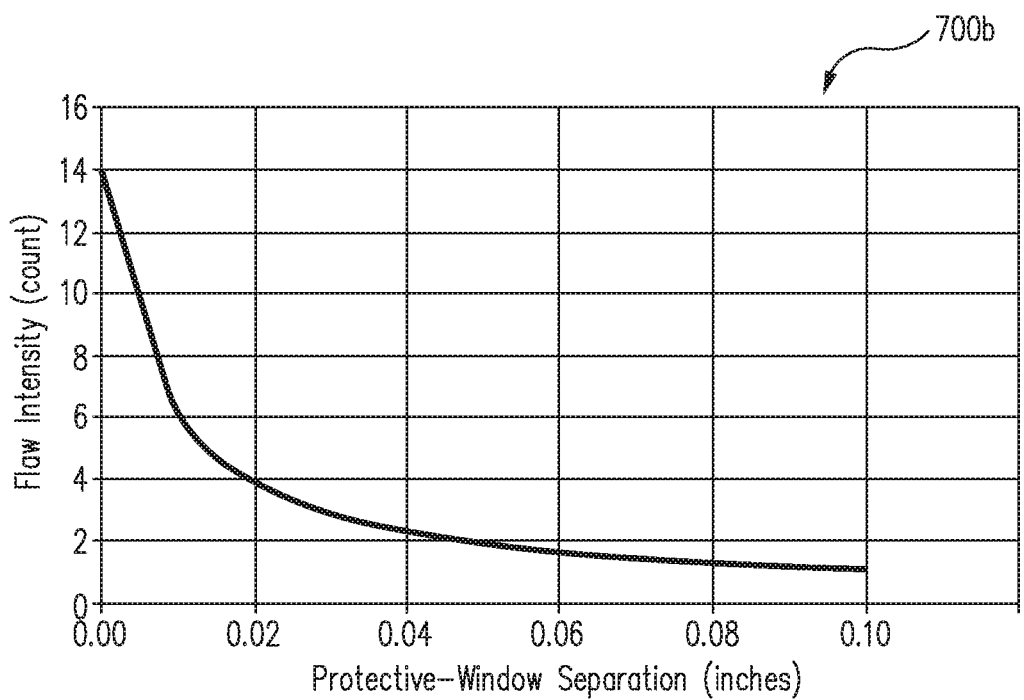
FIG. 7B illustrates comparative flaw count intensity in resulting thermal image data for increasing distance between a protective window and a sensor window, according to an embodiment.

Flaw intensity in the resulting thermal image data may also factor in choosing a distance to place the window 211b from the sensor window 212b. In graph 700b of FIG. 7B, flaw intensity is identified by a count value for pixels displaying the flaw 680b in the resulting thermal image data (e.g., which is one measurement of how apparent the flaw may be in the resulting thermal image data; in other embodiments, other measurements may be used). For example, flaw 680b that is very intense in the thermal image data may result in inconsistencies or unreadable thermal image data. In contrast, less intense flaws may not be noticeable in the thermal image data. Thus, as the distance from the sensor window 212b increases, there is a sharp decline in the count intensity of the irregularity caused by the flaw 680b in the thermal image data. Flaw intensity in the resulting thermal image data decreases inversely proportional (e.g., nonlinearly as shown in FIG. 7B, or otherwise) to the separation distance between the window 211b and the sensor window 212b of imager assembly 110. Thus, a flaw may be very intense where the flaw occurs right at the sensor window 212b or at a very close distance. The intensity may sharply decline as the distance of the flaw 680b from the sensor window 212b increases. Thus, a flaw may be nearly unnoticeable as the separation distance increases.

Figure 8:
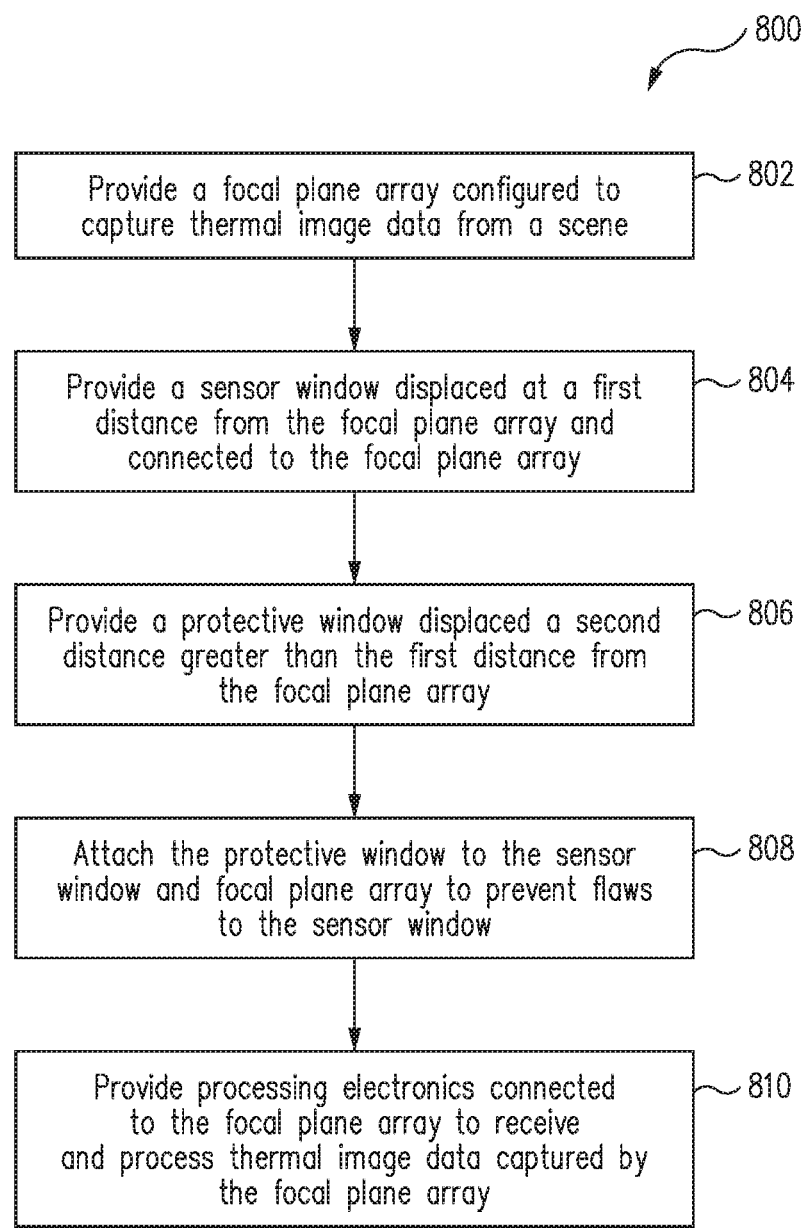
FIG. 8 illustrates a process to assemble a device having a protective window, according to an embodiment.

FIG. 8 illustrates a process to assemble a device having a protective window, according to an embodiment. Note that one or more steps, processes, and methods described herein may be omitted, performed in a different sequence, or combined as desired or appropriate.

At step 802, a focal plane array configured to capture thermal image data from a scene is provided. The focal plane array may comprise one or a plurality of infrared detectors configured to detect thermal radiation from a scene and capture the thermal radiation as a thermal image of the scene. Thus, the focal plane array may be configured to capture thermal image data, which may be processed by attached electronics and/or supporting electronics of a connectable system. The focal plane array may correspond to a plurality of infrared detectors disposed on a substrate.

A sensor window is provided, at step 804, where the sensor window is displayed at a first distance from the focal plane array and connected to the focal plane array. For example, the sensor window may form a wafer-level packaged (WLP) or pixel-level packaged (PLP) assembly with the focal plane array where the focal plane array is vacuum packaged with the sensor window. The sensor window may form a transmissive window to the focal plane array that may allow thermal (e.g., infrared) radiation to penetrate the window and be received by the focal plane array. In further embodiments, the sensor window may also act as an optical device for the focal plane array, thereby focusing incoming thermal radiation to the focal plane array. Thus, the first distance that the sensor window is displaced from the focal plane array may cause the sensor window to be within focus of image captured by the focal plane array.

At step 806, a protective window is provided, which is displaced a second distance greater than the first distance from the focal plane array. The protective window may be formed from a durable material (e.g., silicon, germanium, zinc selenide, chalcogenate glass, plastics, polymers, sapphire, or others) and bonded to a frame using, for example, and epoxy, adhesive, ZYMET, or other chemical bonding agent. The frame may displace the protective window the second distance from the sensor window when the frame is attached to a package (e.g., sensor/window assembly) created from the sensor window and the focal plane array. The second distance may be sufficient to cause the protective window to be out of focus to the sensor window or the focal plane array. For example, the protective window may be displaced greater than 0.025" from the sensor window or the focal plane array in one embodiment, or greater than 0.060" in another embodiment.

The protective window is attached to the sensor window and the focal plane array to prevent flaws to the sensor window, at step 808. As previously discussed, the protective window may be bonded to a frame, which may in turn connect to the package (e.g., the WLP or PLP) containing the sensor window and the focal plane array. The connection may be guided using alignment pins and matching alignment apertures on the frame and the package. Once the protective window, the sensor window, and the focal plane array are joined into one unit, processing electronics may be provided, which may be connected to the focal plane array to receive and process thermal image data captured by the focal plane array. The resulting imager assembly may then be durable enough to prevent flaws to the sensor window and therefore inconsistencies/irregularities in captured thermal image data. The processing electronics may correspond to an FPGA that provides some calibration of the focal plane array, and may further connect to a system for processing the thermal image data captured by the assembled imager assembly.

Figure 9:
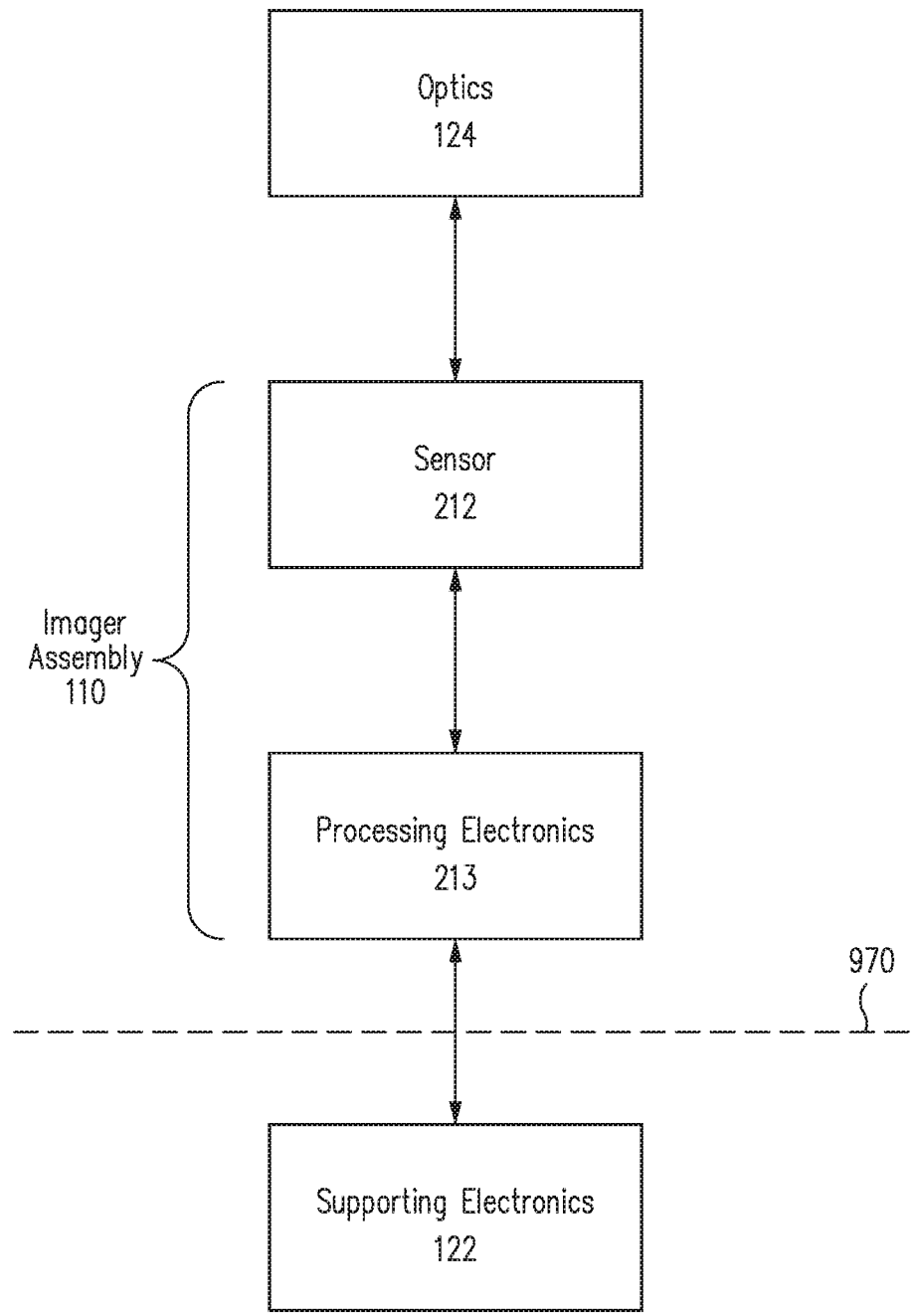
FIG. 9 illustrates a block diagram of a modular imaging system, according to an embodiment.

The imaging systems described herein may be produced from modular components. A modular imaging system may allow for easier manufacturer and greater flexibility during integration. A modular imaging system may include an imager assembly that may interface with a plurality of supporting electronics. The supporting electronics may be provided by a customer the purchased the imager assembly. An imager assembly may be able to interface with multiple different supporting electronics. Such different supporting electronics may, for example, be supporting electronics provided by different customers of the imager assembly. The imager assembly may be configured to allow it to integrate into multiple different imager systems. The modular nature of the imager assembly may decrease development times and imager system costs, as well as increase performance of the imager system. FIG. 9 illustrates a block diagram of a modular imaging system, according to an embodiment.

The modular imager system shown in FIG. 9 includes the optics 124, the sensor 212, the processing electronics 213, and the supporting electronics 122. The optics 124 and the sensor 212 of FIG. 9 may be similar to the optics 124 of FIG. 1 and the sensor 212 of FIG. 2B. In FIG. 9, the processing electronics 213 may receive image data from the sensor 212 and perform certain steps of image processing. In various embodiments, the processing electronics 213 may perform any image processing step described herein, but in the embodiment shown in FIG. 9, the processing electronics 213 may perform certain specific image processing steps. For example, the processing electronics 213 may interface with the sensor 212 and/or the optics 124 and provide instructions for controlling the sensor 212 and/or the optics 124. Additionally, the processing electronics 213 may process image data received from the sensor 212 by adjusting the thermal image data outputted by the sensor 212 according to calibration terms. The calibration terms may be determined by the processing electronics 213 (e.g., through self-calibration processes performed by the imager assembly 110) and/or through calibration performed at a point of manufacture or assembly of the imager assembly 110. The processing electronics 213 may also compensate for drift and responsivity variations of the sensor 212 (e.g., variations within a focal plane array of the sensor 212) and adjust the thermal image data received from the sensor 212 according to non-uniformity correction terms. The non-uniformity correction terms may also be determined by the processing electronics 213 (e.g., through non-uniformity detection processes, such as through shutters that may simulate blackbodies or through shutter-less non-uniformity detection processes) and/or by non-uniformity correction performed at a point of manufacture or assembly (e.g., factory calibration). The processing electronics 213 may also adjust the thermal image data according to a bad pixel map. In certain embodiments, the processing electronics 213 may include processes directed towards detecting bad pixels in, for example, a focal plane array of the sensor 212. In certain embodiments, the processing electronics 213 may convert image data received from the sensor 212 into an industry standard format for further processing. In such embodiments, processing of the image data may at least partially be performed through an analog-to-digital convertor.

The supporting electronics 122 may receive image data processed by the processing electronics 213 via, for example, a connector interface (e.g., the mating of a connector on the imager assembly 110 with a connector on the supporting electronics 122). The supporting electronics 122 may connect to the processing electronics 213 via, for example, connector 213e. The supporting electronics 122 may further process the image data received. The supporting electronics 122 may perform one or more of adjusting a temperature range of the image data, adjusting a gain of the image data, compensating for residual non-uniformity within the image (e.g., temporal drift), compensating for lens illumination roll-off, compensating for non-uniformity due to out-of-field irradiance differences (e.g., differences between shutter-closed and shutter-open conditions), adjusting a resolution of the image, and/or performing additional image processing techniques such as noise filtering. Noise filtering may include column filtering, temporal filtering, scene-based non-uniformity correction, and other image noise filtering or noise reduction processes.

The sensor 212 and the processing electronics 213 may form an imager assembly 110. In certain embodiments, the optics 124, the sensor 212, and the processing electronics 213 may be integrated into one module or system that is designed to connect to and disconnect from the supporting electronics 122. Such a configuration is accordingly shown by a dashed line 970 that represents a point of interface (e.g., connector or multiple connectors) between the imager assembly 110 and the supporting electronics 122. The point of interface may be mated connectors of the imager assembly 110 and the supporting electronics 122 or may be another connection such as a wireless connection or a wire connection. In such embodiments, the imager assembly 110 may include certain processes programmed into the processing electronics 213. A modular imager assembly that may interface with multiple different supporting electronics may allow certain image processing (e.g., image processing that may be performed by most or all imaging devices) to be performed within the imager assembly while allowing the supporting device to perform additional image process (e.g., image processing that may be specific to one manufacturer or product SKU). Such a modular imager assembly may allow for greater flexibility in the development of imaging systems and may decrease product development lead times as well as increase performance of the imaging systems.

Also, the processing electronics 213 may be able to interface with multiple different supporting electronics 122. Such different supporting electronics 122 may, for example, be supporting electronics provided by different customers of the imager assembly 110. The imager assembly 110 may be configured to allow it to integrate into multiple different imager systems.

Figure 10:
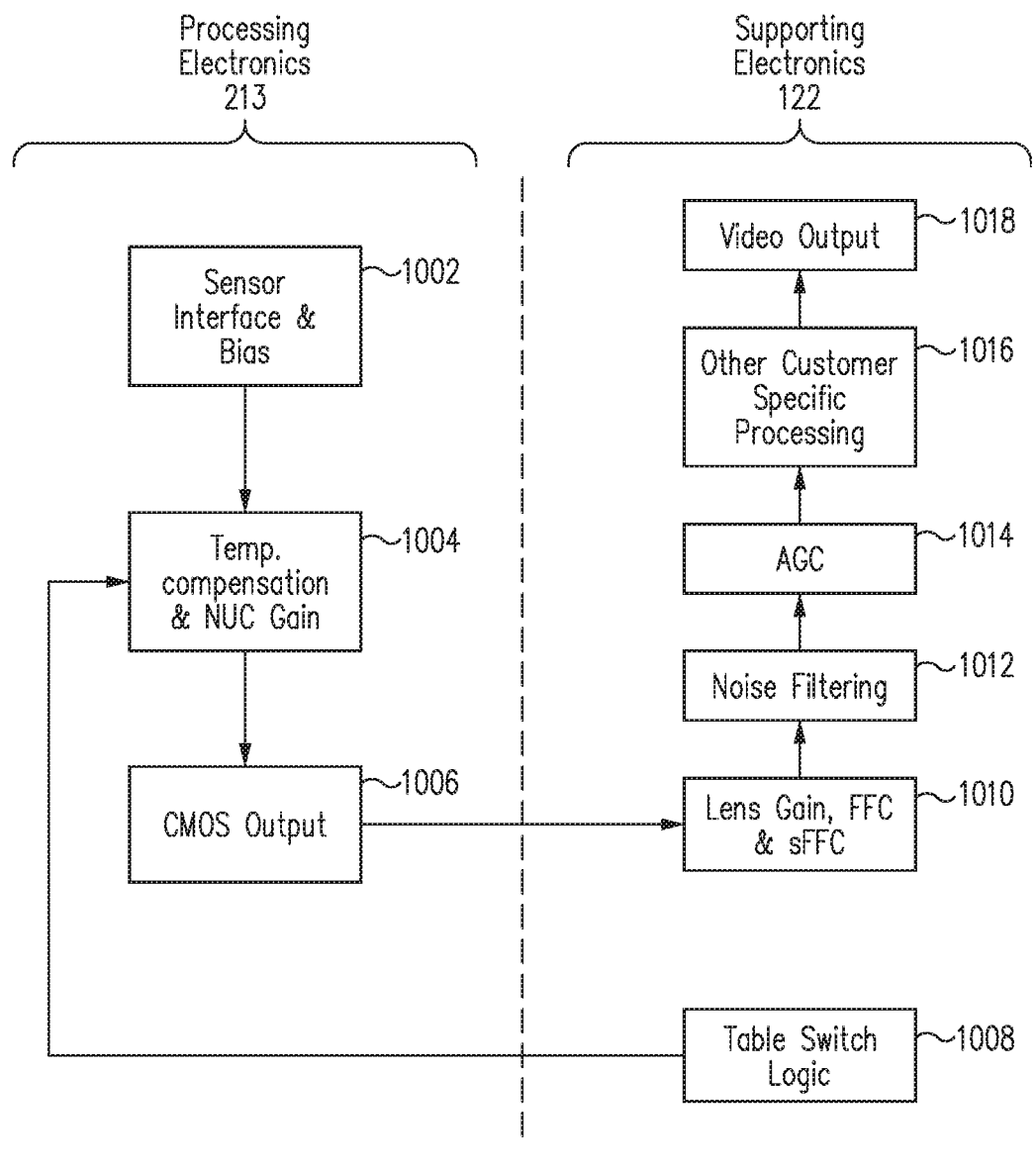
FIG. 10 illustrates a block diagram detailing various processes performed by assemblies within a modular imaging system.

FIG. 10 illustrates a block diagram detailing various processes performed by assemblies within a modular imaging system. FIG. 10 may illustrate image processing performed by the processing electronics 213 and the supporting electronics 122.

In block 1002, the processing electronics 213 may interface with the sensor 212 by, for example, providing instructions for the control of the sensor 212 and/or receiving data from the sensor 212. Additionally, the processing electronics 213 may bias a voltage to the sensor 212. In block 1004, the processing electronics 213 may also process image data by performing temperature compensation and non-uniformity correction. In certain embodiments, the correction terms used to perform temperature compensation and/or non-uniformity correction may vary according to one or more environment factors (e.g., ambient temperature, precipitation, time of day, or other factors). In such embodiments, the processing electronics 213 and/or the supporting electronics 122, as illustrated in FIG. 10, may include multiple sets of correction terms that may be applied depending on the detected environmental factor. In the embodiment shown in FIG. 10, the supporting electronics 122 may, in block 1008, include such correction terms and may output the appropriate correction term to the processing electronics 213 for use in the processing of image data in block 1004 depending on the detected environmental condition. The image data processed by the processing electronics 213 may be outputted to the supporting electronics 122 in block 1006.

The supporting electronics 122 may receive image data from the processing electronics 213. The supporting electronics 122 may further process the image data by adjusting the image data according to a lens gain in block 1010. Lens gain may be gain within the image from an intervening object between the scene and the focal plane array, such as a lens or optics. The supporting electronics 122 may also instruct the sensor 212 to carry out a flat field correction process in block 1010 as well as filter noise from the image data (via, for example, column and/or row filtering, temporal filtering, scene based non-uniformity correct, Digital Detail Enhancement) in block 1012, perform automatic gain control in block 1014, and perform other specific processes as needed by a customer in block 1016. Thus, a customer purchasing the imager assembly 110 with the processing electronics 213 may be able to customize the processing of the image data or control of the imager assembly 110. The supporting electronics 122 may also output processed image data to, for example, a user interface or a screen for viewing by a viewer in block 1018.

Figure 11:
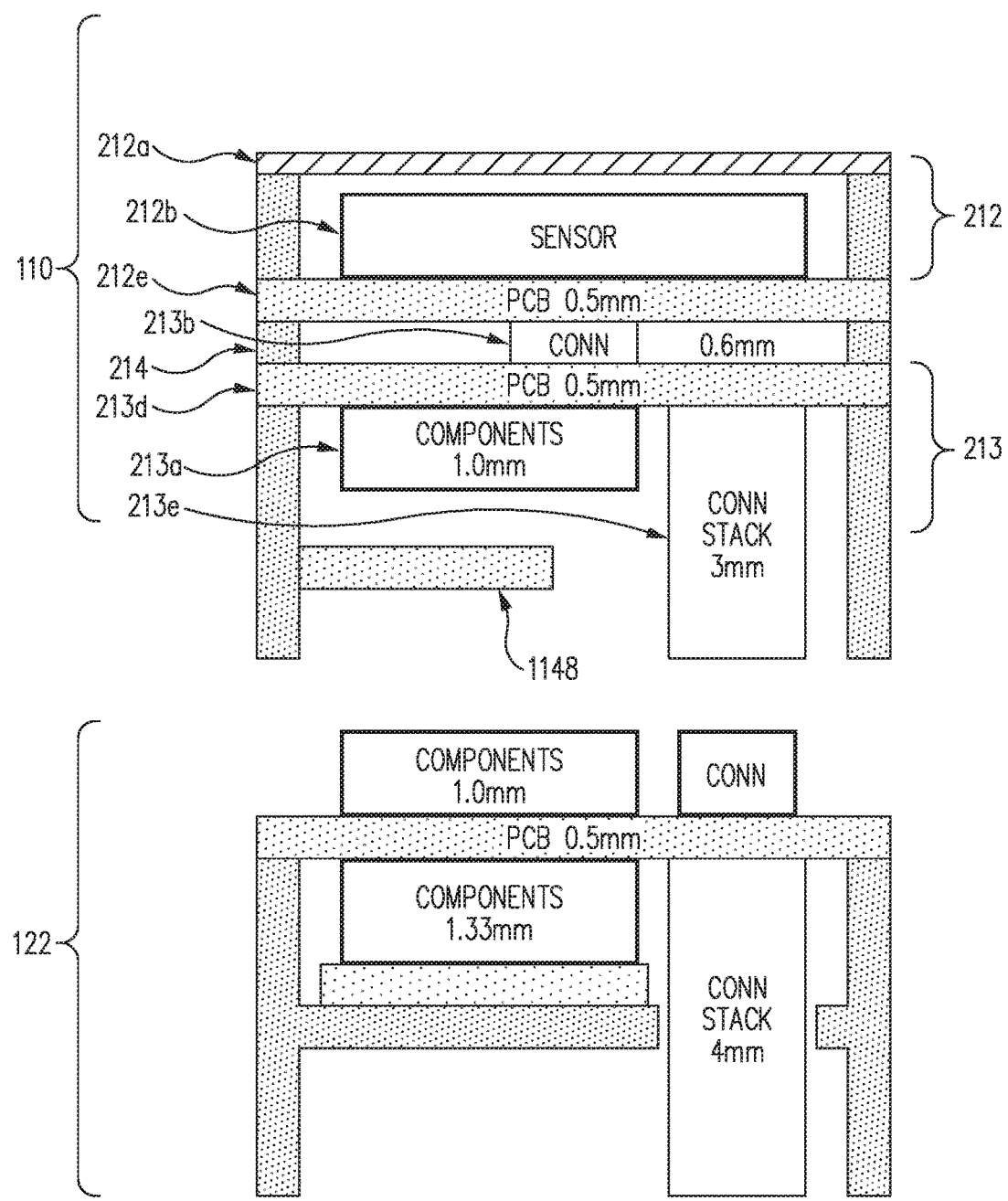
FIG. 11 illustrates a block diagram of a modular imager system having a protective window assembly, according to an embodiment.

The modular imager system may be divided into multiple modules. The modules may be combined to form an imager system. FIG. 11 illustrates a block diagram of a modular imager system having a protective window assembly, according to an embodiment.

The imager assembly 110 shown in FIG. 11 may include the sensor/window assembly 212 and the electronics 213. The imager assembly 110 of FIG. 9 may be similar to the imager assembly 110 of FIG. 2B. Certain embodiments of the imager assembly 110 may also include a protective window assembly (not shown) similar to the protective window assembly 211 of FIG. 2B.

The focal plane array 212a is shown disposed on a printed circuit board (PCB) 212e that holds the infrared sensors of the focal plane array 212a in place and allows a connection for receiving thermal image data detected by the focal plane array 212a. Connected to the sensor/window assembly 212, through the at least one connector 213b, are the electronics 213. In certain other embodiments, the printed circuit board 212e and the printed circuit board 213d may be integrated as one board. In such embodiments, as there is no board to connect, connector 213b may be eliminated.

The electronics 213 are shown as FPGA 213a attached to a backside of a PCB 213d to prevent interference and damage to and by the sensor/window assembly 212 and/or the PCB 212e of the sensor/window assembly 212 and/or the PCB 213d the electronics 213. Spacer 1148 may provide spacing between the electronics 213 and supporting electronics that are designed to interface with the electronics 213 via the connector 213e. The spacer 1148 may also cover at least a part of the backside of the PCB 213d and, thus, protect the FPGA 213a from damage. Certain embodiments of the spacer 1148 may include a gap for the connector 213e and may fill the volume between the electronics 213 and the cover 1148 with another material, such as an expandable foam, for further protection and heat dissipation efficiency.

The supporting electronics 122 may be connected to the imager assembly 110 via the connector 213e. The supporting electronics, when connected to the imager assembly 110, may receive image data processed by the electronics 213 and may further process such image data. Accordingly, the electronics 213 may perform a portion of image processing, while the supporting electronics may perform another portion of the image processing. Such a configuration may reduce the processing requirements of the electronics 213, allowing the electronics 213 to operate at a lower temperature and also allow for more complex processing of the image data.

Figure 12:
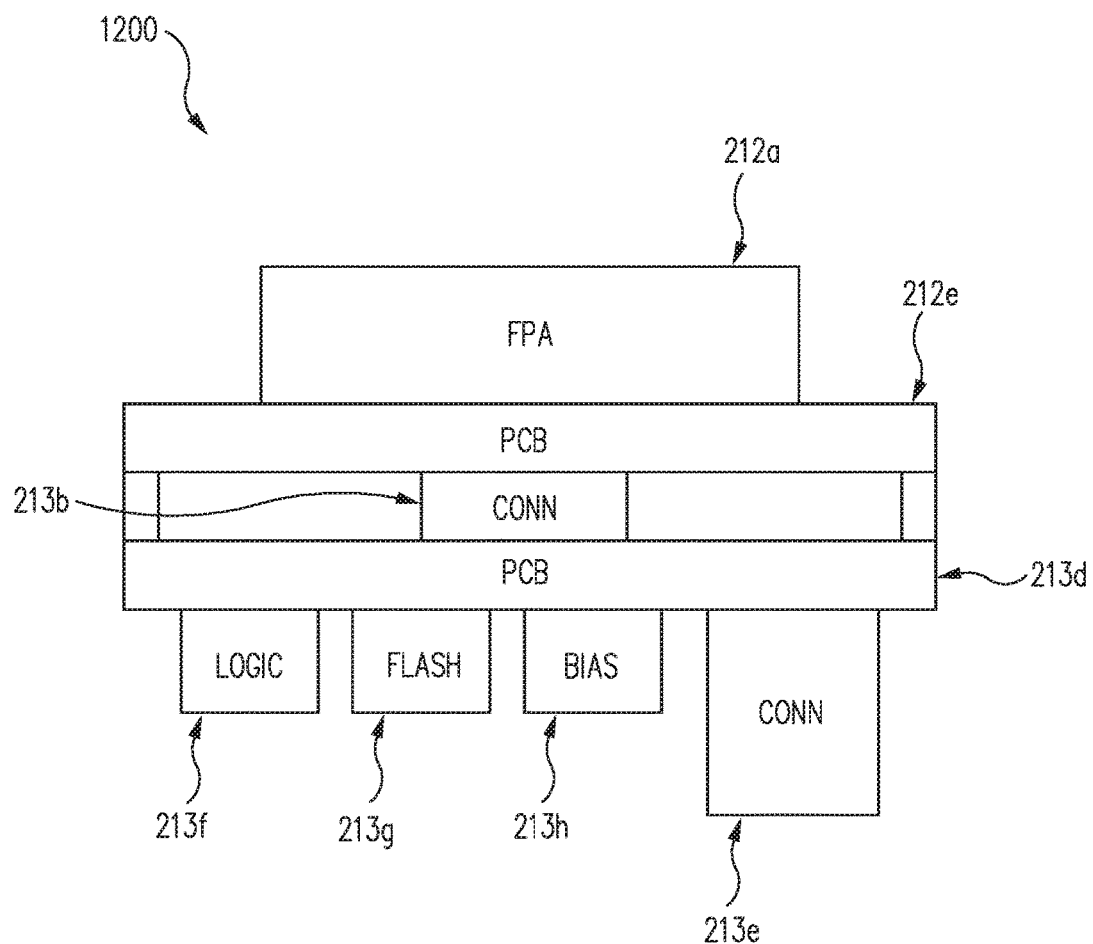
FIG. 12 illustrates a block diagram of various components of a module imager assembly, according to an embodiment.

FIG. 12 illustrates a block diagram of various components of a module imager assembly, according to an embodiment. The imager assembly 1200 may include a FPA 212a mounted on a first PCB 212e. The first PCB 212e may be connected to a second PCB 212d via a connector 213b. The second PCB 212d may include logic processor 213f, flash memory 213g, and bias electronics 213h. Additionally, the second PCB 212d may include a connector 213e that allows the imager assembly 1100 to connect to supporting electronics. The imager assembly 1100 may be a module that may perform some image processing (e.g., through the logic processor 213f) and may output the processed image data to the supporting electronics for additional processing.

The FPA 212a may capture a scene (such as through a thermal image) and output image data representative of the scene to the logic processor 213f and/or flash memory 213g via the connector 213b. The logic processor 213f may be a logic device, such as a processor, that may process the image data outputted by the imager assembly 1200. The image data processed by the logic processor 213f may be in an industry standard, exportable format.

Flash memory 213g may be random access memory associated with the logic processor 213f, non-transitory memory for storage of, for example, image data, and/or flash calibration data that may be applied to the image data outputted by the FPA 212a to create corrected or processed image data. The flash calibration data may be created through calibration techniques performed by the imager assembly 1200, or may be loaded onto the flash memory 213g at a point of manufacture. Bias electronics 213h may bias voltage or current associated with controlling the image assembly 1200.

Figure 13:
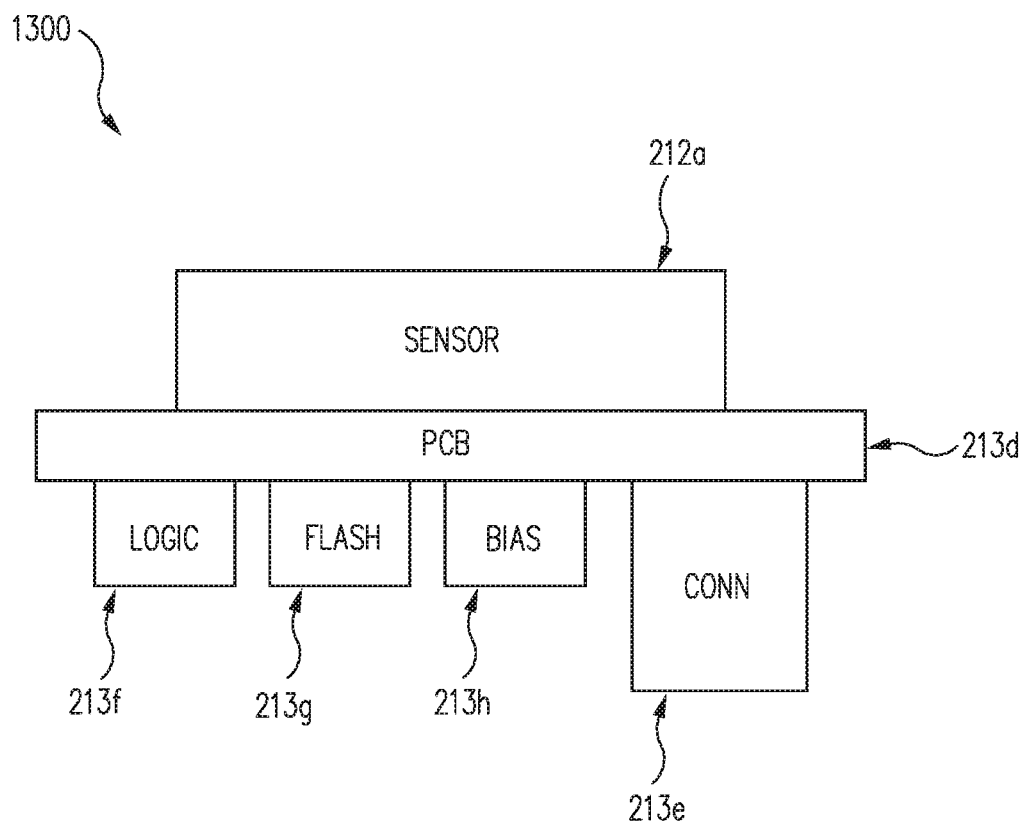
FIG. 13 illustrates a block diagram of another embodiment of various components of a modular imager assembly, according to an embodiment.

FIG. 13 illustrates a block diagram of another embodiment of various components of a modular imager assembly, according to an embodiment. The imager assembly 1300 of FIG. 13 may be similar to the imager assembly 1200 of FIG. 12. However, the imager assembly 1300 may include the FPA array 212a and the logic processor 213f, flash memory 213g, and bias electronics 213h on one PCB board, PCB board 213d as shown in FIG. 13, instead of on separate PCB boards as shown in FIG. 12. The FPA array 21a may be mounted on a first side of the PCB board 213d while the logic processor 213f, flash memory 213g, and bias electronics 213h may be mounted on a second side of the PCB board 213d. In other embodiments, components such as the logic processor 213f, flash memory 213g, and/or the bias electronics 213h may be mounted on the same side of a PCB board as the FPA array 212a.

Figure 14:
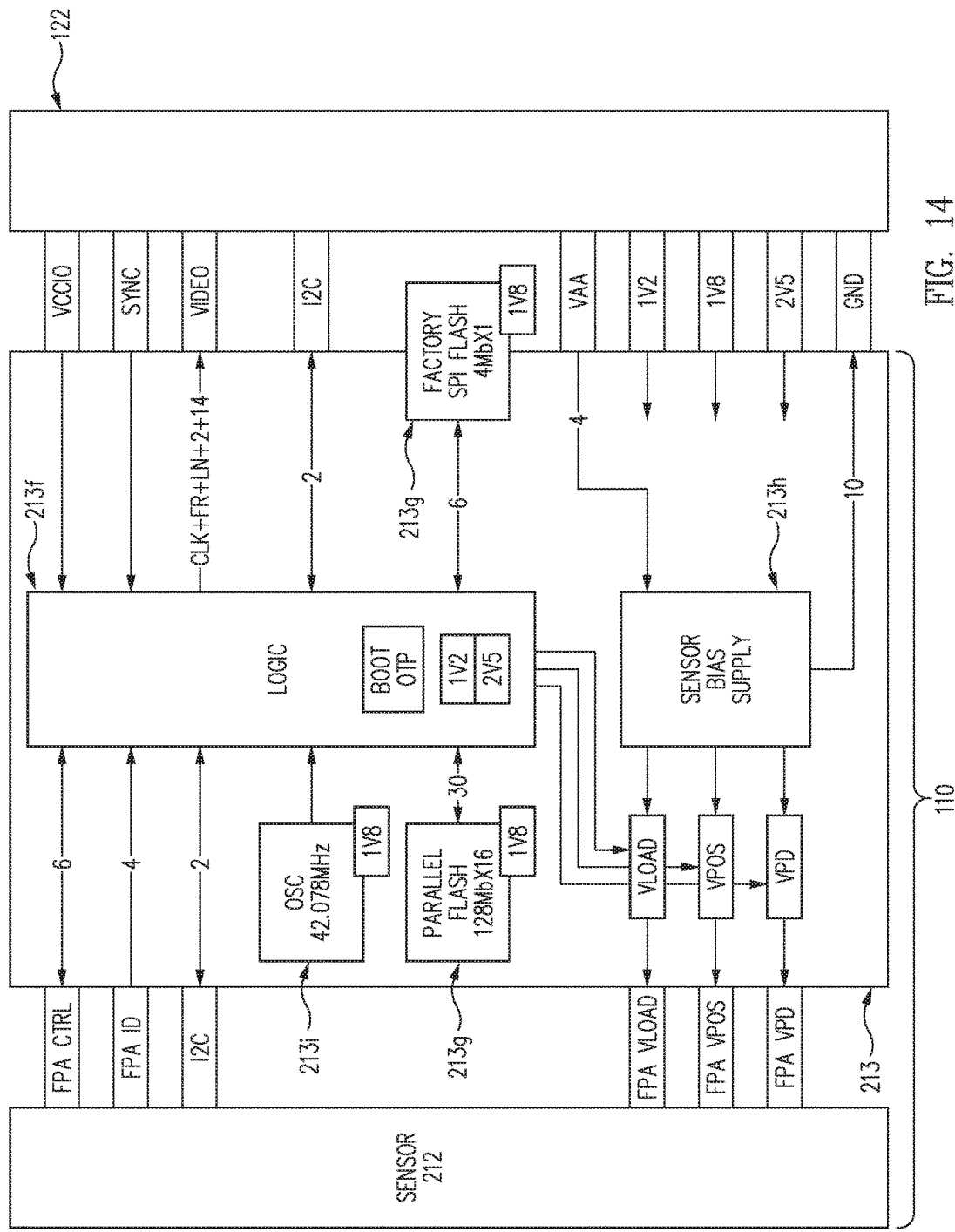
FIG. 14 illustrates a block diagram showing components of an imager assembly of a modular imager system, according to an embodiment.

The modular imager system may be further illustrated as multiple separate modules that may be incorporated into an imager system. FIG. 14 illustrates a block diagram showing components of an imager assembly of a modular imager system, according to an embodiment. FIG. 14 shows an imager assembly 110 that includes a sensor 212 and processing electronics 213 as well as supporting electronics 122.

The sensor 212 may be similar to sensors described herein. The processing electronics 213 may include logic processor 213f, flash memory 213g, bias electronics 213h, and clock 213i. The logic processor 213f, flash 213f, and the bias electronics 213h may be similar to their respective components described in FIG. 13.

The logic processor 213f may detect the type of the sensor 212 and may, accordingly, configure the processing electronics 213 to interface with the sensor 212. Detection of the sensor type may allow the logic processor 213f to configure various aspects of the processing electronics 213 to optimize and process image data outputted by the sensor 212. The logic processor 213f may also provide instructions to the sensor 212 to control the sensor 212 in the imaging of scenes (e.g., via controlling a zoom, temperature range, and/or resolution of the sensor 212). The sensor 212 may also communicate data, such as acknowledgements or status updates, to the logic processor 213f.

The logic processor 213f may also receive image data outputted by the sensor 212. The logic processor 213f may process the image data using the techniques described herein, and may output the image data to the supporting electronics 122 for further processing by the supporting electronics 122.

The bias electronics 213h may generate bias voltage and/or current to the sensor 212. The bias electronics 213h may be configured according to a standard CMOS voltage (e.g., a spec provided by a customer purchasing the module). The bias voltage and/or current generated by the bias electronics 213h may be controlled by the logic processor 213f and/or by the supporting electronics 122.

The flash memory 213g may store calibration data that may be used to calibrate the sensor 212 and/or process the image data outputted by the sensor 212. The calibration data may be applied to the image data to create a temperature stabilized output. Such a temperature stabilized output may allow video recorded by the sensor 212 to be consistent from frame to frame. Additionally, the clock 213i may be any clock known to one of ordinary skill in the art.

Figure 15:
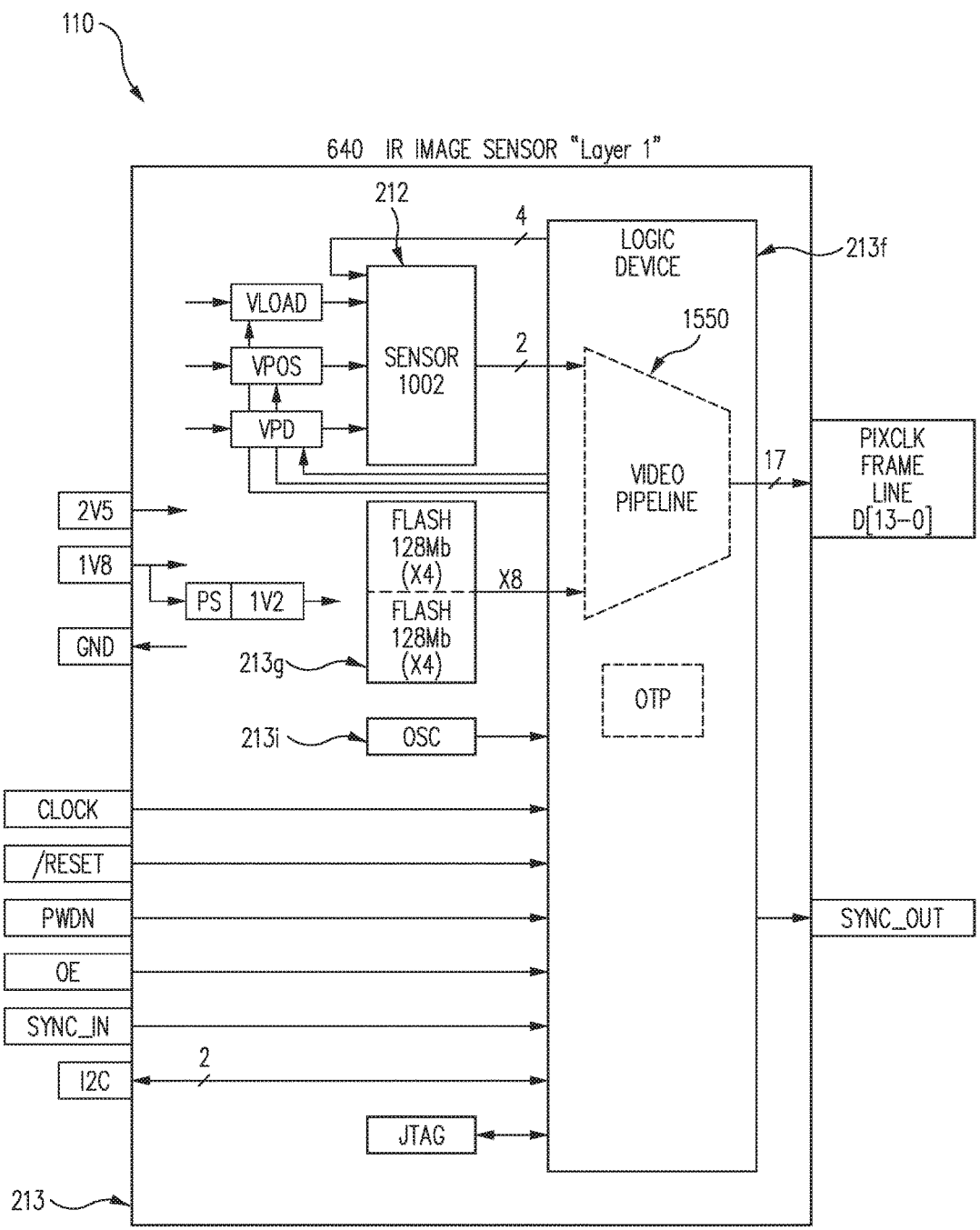
FIG. 15 illustrates another block diagram showing components of another imager assembly of a modular imager system, according to an embodiment.

FIG. 15 illustrates another block diagram showing components of another imager assembly of a modular imager system, according to an embodiment. The imager assembly 110 shown in FIG. 15 may include a sensor 212 and processing electronics 213 with a logic processor 213f, flash memory 213g, and a clock 213i. The logic processor 213f, flash memory 213g, and clock 213i may be similar to the respective components described herein (e.g., in FIG. 14). However, in the embodiment shown in FIG. 15, the sensor 212 may be mounted on the same PCB or integrated within the same module as the processing electronics 213 instead of being located on a component separate from the processing electronics 213 (e.g., on a separate PCB) as illustrated by the embodiment in FIG. 14.

The imager assembly 110 may also include the video pipeline 1550. The video pipeline 1550 may receive image data from the sensor 212. The image data from the sensor 212 may be video image data, that is may be a stream of frames of a video. The logic processor 213f may process the image data from the sensor 212 by standardizing the image data (e.g., by stabilizing temperatures shown in the image to produce consistent images frame to frame) and/or buffering the video and output the video data to the supporting electronics.

Figure 16:
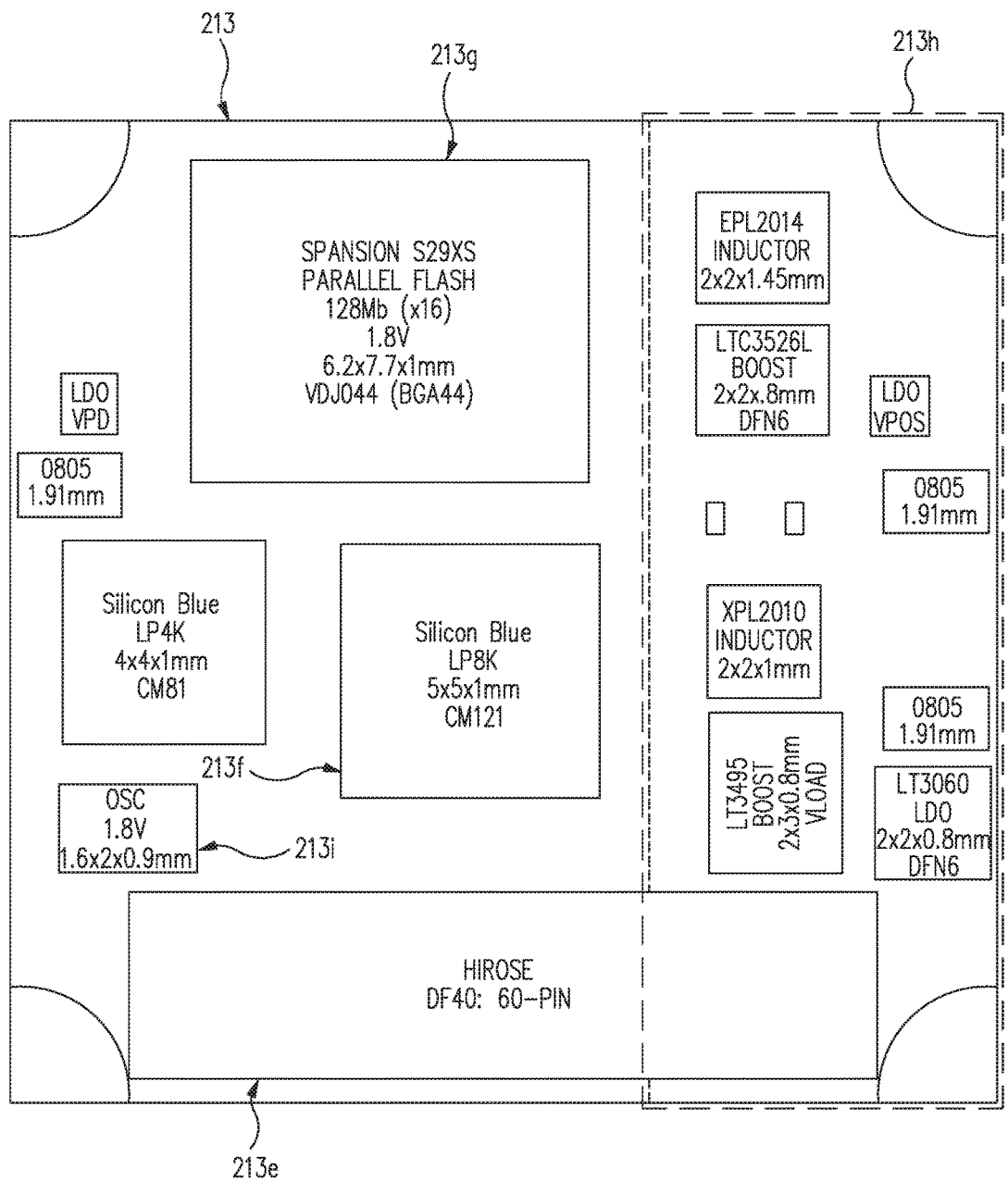
FIG. 16 illustrates a board layout of a printed circuit board assembly of an imager assembly, according to an embodiment.

FIG. 16 illustrates a board layout of a printed circuit board assembly of an imager assembly, according to an embodiment. FIG. 16 may illustrate processing electronics 213 mounted on one PCB. The processing electronics 213 may include a logic device 213f, a flash memory 213g, a clock 213i, bias electronics 213h, and a connector 213e. The logic device 213f, the flash memory 213g, the clock 213i, the bias electronics 213h, and the connector 213e may be similar to their respective components described herein. However, while the embodiment of the processing electronics 213 shown in FIG. 16 shows the connector 213e located on the same side as the logic device 213f, the flash memory 213g, the clock 213i, and the bias electronics 213h, other embodiments may mount the connector 213e on a side of the PCB opposite the other components.

Figure 17:
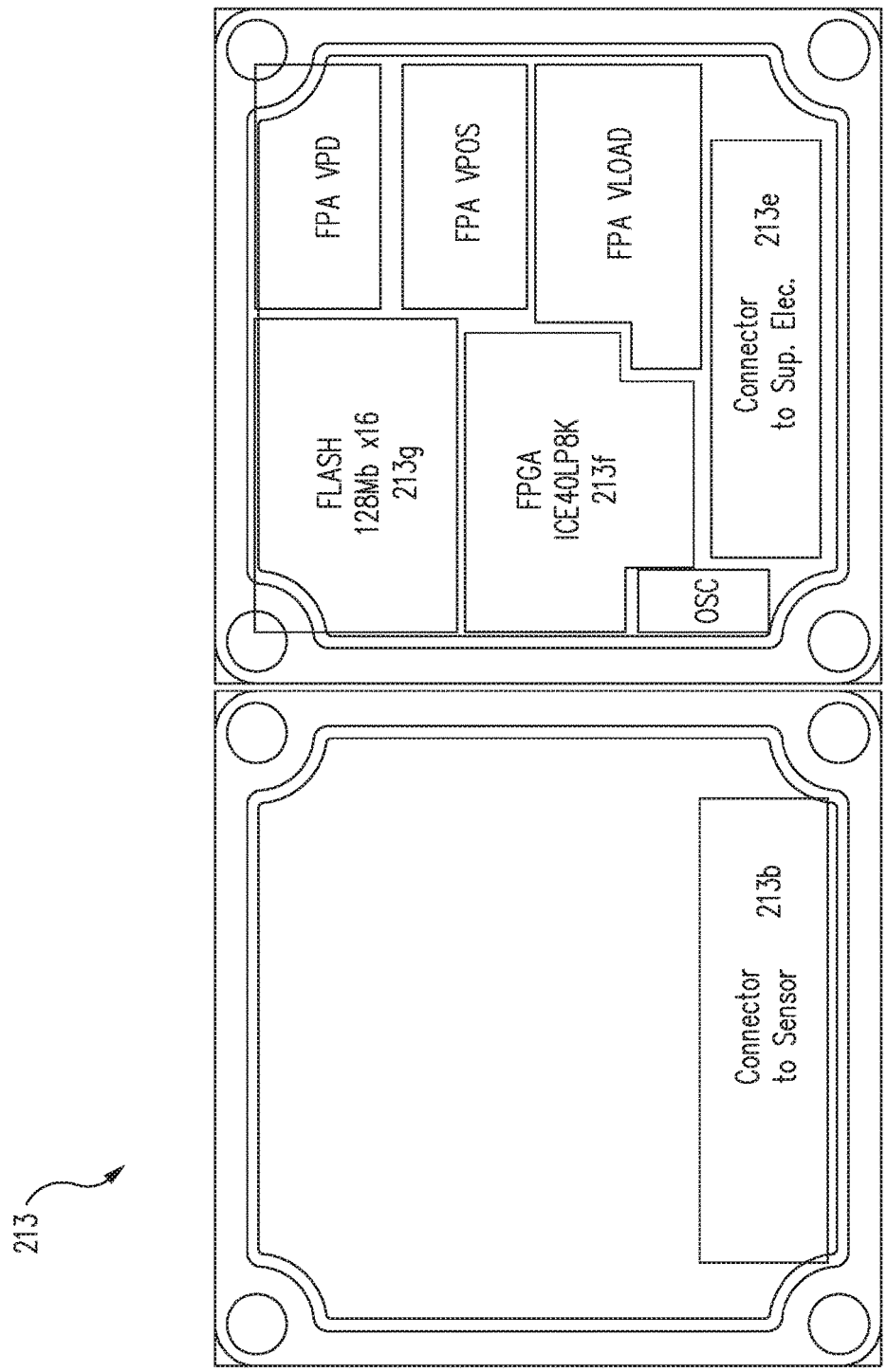
FIG. 17 illustrates a front and back board layouts of another printed circuit board assembly of an imager assembly, according to an embodiment.

FIG. 17 illustrates a front and back board layout of another printed circuit board assembly of an imager assembly, according to an embodiment. The PCB shown in FIG. 17 includes processing electronics such as the logic processor 213f and the flash memory 213g, as well as a first connector 213b, and a second connector 213e. The first connector 213b may be located on a first side of the PCB and may allow the processing electronics to interface with another PCB that may include a focal plane array and/or sensor. The connector 213e may be located on a second side of the PCB and may allow the processing electronics to interface with supporting electronics.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
    an imager assembly comprising:
        a focal plane array configured to capture thermal image data from a scene and output the thermal image data,
        a printed circuit board assembly, and
        processing electronics communicatively connected to the focal plane array through the printed circuit board assembly and configured to perform a non-uniformity correction process on the thermal image data to provide corrected thermal image data without automatic gain correction; and
    a connector communicatively connected to the imager assembly and configured to:
        modularly interface with supporting electronics configured to perform an automatic gain correction process on the corrected thermal image data,
        pass the corrected thermal image data in a first direction to the supporting electronics, and
        receive a table switch logic signal in a second direction from the supporting electronics to customize the non-uniformity correction process performed by the processing electronics, wherein the table switch logic signal is dependent on a detected environmental condition.

2. The system of claim 1, wherein the supporting electronics is provided by a third party and is configured to perform third party-specific image processing.

3. The system of claim 1, wherein the processing electronics is further configured to calibrate the focal plane array.

4. The system of claim 1, wherein the processing electronics is further configured to control the focal plane array.

5. The system of claim 1, further comprising the supporting electronics connected to the imager assembly through the connector.

6. The system of claim 5, wherein the processing electronics and/or the supporting electronics comprises a field-programmable gate array.

7. The system of claim 5, wherein the supporting electronics comprises a supporting processor configured to additionally process the thermal image data by adjusting a lens gain, performing flat field correction, filtering noise, and/or performing third party-specific image processing.

8. The system of claim 1, wherein the imager assembly further comprises an analog-to-digital converter.

9. The system of claim 1, wherein the printed circuit board assembly comprises:
    a first printed circuit board having the focal plane array disposed thereon;
    a second printed circuit board having the processing electronics disposed thereon; and
    an intermediate connector communicatively connected between the first and second printed circuit boards to pass the thermal image data from the focal plane array to the processing electronics, wherein the focal plane array and the processing electronics are mounted on substantially opposite sides of the first and second printed circuit boards.

10. The system of claim 9, further comprising a spacer adjacent to the printed circuit board assembly to offset the processing electronics from the supporting electronics.

11. The system of claim 10, wherein the spacer comprises a cover at least partially disposed between a side of the second printed circuit board and the supporting electronics.

12. The system of claim 11, wherein the processing electronics are mounted on a side of the second printed circuit board facing the cover and a volume between the cover and the processing electronics are at least partially filled with a protective filler.

13. The system of claim 1, wherein the system is configured to be integrated into an infrared camera comprising a processing component configured to further process the thermal image data.

14. The system of claim 1, further comprising:
    a sensor window displaced a first distance from the focal plane array; and
    a protective window displaced a second distance greater than the first distance from the focal plane array, wherein the second distance is predetermined such that damage or debris incident on the protective window is out of focus in the thermal image data.

15. A method comprising:
    capturing thermal image data from a scene with a focal plane array of an imager assembly;
    outputting the thermal image data to processing electronics of the imager assembly;
    performing, by the processing electronics, a non-uniformity correction process on the thermal image data to provide corrected thermal image data without automatic gain correction;
    passing, by a connector in a first direction, the corrected thermal image data to supporting electronics configured to perform an automatic gain correction process on the corrected thermal image data, wherein the connector modularly interfaces between the imager assembly and the supporting electronics; and
    receiving, by the connector in a second direction, a table switch logic signal from the supporting electronics to customize the non-uniformity correction process performed by the processing electronics, wherein the table switch logic signal is dependent on a detected environmental condition.

16. The method of claim 15, wherein additionally processing the thermal infrared image with the supporting electronics comprises adjusting a lens gain, performing flat field correction, filtering noise, and/or performing customer specific image processing.

17. The method of claim 16, further comprising calibrating the focal plane array with the processing electronics.

18. A method of manufacture comprising:
receiving an imager assembly with a focal plane array, a printed circuit board assembly, processing electronics communicatively connected to the focal plane array through the printed circuit board assembly and configured to perform a non-uniformity correction process on thermal image data to provide corrected thermal image data without automatic gain correction, and a connector;
coupling the imager assembly to modularly interface, via the connector, to supporting electronics, wherein the connector is configured to:
pass the corrected thermal image data in a first direction to the supporting electronics configured to perform an automatic gain correction process on the corrected thermal image data, and
receive a table switch logic signal in a second direction from the supporting electronics to customize the non-uniformity correction process performed by the processing electronics, wherein the table switch logic signal is dependent on a detected environmental condition; and
assembling the imager assembly and the supporting electronics into an infrared camera.

19. The method of claim 18, wherein the supporting electronics is provided by one or more customers and is configured to perform customer specific image processing.

20. The method of claim 19, further comprising configuring the imager assembly to perform the customer specific image processing.

* * * * *